US012674478B2

(12) United States Patent
Distelmans et al.

(10) Patent No.: US 12,674,478 B2

(45) Date of Patent: Jul. 7, 2026

(54) FLUID VORTEX BREAKER

(71) Applicant: HYDROGENICS CORPORATION, Mississauga (CA)

(72) Inventors: Michel Distelmans, Booischot (BE); Julie Colin, Columbus, IN (US); Robert Sperry, Columbus, IN (US); Dustin Vickress, Mississauga (CA); Michael Vale, Elmira (CA)

(73) Assignee: HYDROGENICS CORPORATION, Mississauga (CA)

( * ) Notice: Subject to any disclaimer, the term of this patent is extended or adjusted under 35 U.S.C. 154(b) by 411 days.

(21) Appl. No.: 18/316,728

(22) Filed: May 12, 2023

(65) Prior Publication Data

US 2023/0375016 A1 Nov. 23, 2023

Related U.S. Application Data

(60) Provisional application No. 63/344,456, filed on May 20, 2022.

(51) Int. Cl.

*F15D 1/00* (2006.01)
*B01D 19/00* (2006.01)
*C25B 15/08* (2006.01)

(52) U.S. Cl.

CPC ......... *F15D 1/008* (2013.01); *B01D 19/0042* (2013.01); *C25B 15/083* (2021.01)

(58) Field of Classification Search

CPC .......... F15D 1/00; F15D 1/0065; F15D 1/008; F15D 1/02; F15D 1/025; B01D 19/0042; B01D 19/02; C02F 1/20

See application file for complete search history.

(56) References Cited

U.S. PATENT DOCUMENTS

| | | | | |
|---|---|---|---|---|
| 10,137,387 | B2 * | 11/2018 | Skoglund ........... | B01D 19/0042 |
| 2003/0192827 | A1 * | 10/2003 | McDowell ............. | B01D 21/04 210/623 |
| 2005/0115408 | A1 * | 6/2005 | Kilgore ..................... | B04C 5/14 95/271 |
| 2021/0323003 | A1 * | 10/2021 | Johnston ................... | B04C 5/04 |

FOREIGN PATENT DOCUMENTS

| | | |
|---|---|---|
| WO | 2013/024468 | 2/2013 |
| WO | 2015/040175 | 3/2015 |
| WO | 2021/144594 | 7/2021 |

* cited by examiner

*Primary Examiner* — Ryan B Huang

(74) *Attorney, Agent, or Firm* — Barnes & Thornburg LLP

(57) ABSTRACT

A vortex breaker assembly includes a vessel, a first conduit, and a fluid source. The vessel having a first fluid arranged therein. The vessel includes an opening formed in an outer wall. The first conduit is coupled to the vessel and configured to open into the vessel via the opening such that the first fluid can flow into the first conduit via the opening. The first conduit includes an inlet formed therein. The fluid source provides a second fluid to the at least one inlet. The second fluid flows into the first conduit from the inlet at a predetermined flow momentum such that the second fluid interacts with the first fluid flowing from the vessel and through the first conduit so as to disrupt a flow field of the first fluid and minimize formation of a fluidic vortex of the first fluid at the opening.

16 Claims, 11 Drawing Sheets

FLUID VORTEX BREAKER

CROSS-REFERENCE TO RELATED APPLICATIONS

This nonprovisional application claims the benefit and priority, under 35 U.S.C. § 119(e) and any other applicable laws or statutes, to U.S. Provisional Patent Application Ser. No. 63/344,456 filed on May 20, 2022, the entire disclosure of which is hereby expressly incorporated herein by reference.

TECHNICAL FIELD

The present disclosure generally relates to a fluid vortex breaker for electrolysis systems and methods.

BACKGROUND

Electrolysis systems typically include fluidic systems having gas and/or liquid separators (gas/liquid separators). For example, electrolysis systems may include electrolyzer cell stacks, which use an electric current to split water into hydrogen gas and oxygen gas. A system to manage this process is called balance of stack.

The mechanical process of this balance of stack serves to provide cooling of the stack, as well as separation between the cooling liquid and produced gas streams. As a further example, the gas/liquid separator on an oxygen side of the electrolyzer cell stacks is typically the largest equipment of an electrolysis unit. Highly purified and cooled water is circulated through the oxygen side of the electrolyzer cell stacks before entering the gas/liquid separator. A split stream from the oxygen side and the crossover water formed on the hydrogen side enters a polishing loop, which treats the water to remove particles, bacteria, and other contaminants to maintain water purity. The water is then returned to the gas/liquid separator.

At the point where the main water flow exits the separator, gas entrainment should be avoided. This may be a challenge in conventional systems due to the varying level of water inside the separator and because the amount of liquid is relatively large compared to the amount of gas. One gas entrainment effect is suction of gas through an outlet pipe of the separator (e.g., by a pumping system) that creates a vortex from a surface if the gas/liquid and down into the outlet pipe. This vortex may create too high a level of gas in the liquid outlet pipe, which is detrimental for the downstream pumping system. It would thus be advantageous to reduce the formation of a vortex at the outlet pipe of the separator.

Conventional systems for reducing vortex formation at the outlet pipe of the separator include mechanical vortex breakers that may include physical walls inserted into the outlet pipe. Surfaces of the walls of these mechanical vortex breakers are aligned with the longitudinal direction of the outlet pipe. The walls may extend from the outlet pipe and into the separator, and in some cases, may include a circular top plate on top of the wall and perpendicular thereto.

These mechanical vortex breakers, however, have many drawbacks. These types of mechanical breakers still allow some vortex formation in the vessel. Moreover, the circular plate on top of the walls needs to remain under an interface level where the water meets the oxygen/hydrogen to efficiently break the vortex, which restricts the usable volume of the vessel, thus requiring larger vessels.

Furthermore, performance of these mechanical breakers reduces if a water level falls below the vortex breaker ideal operating height. Even further, if the height of the circular plate is lowered to ensure that it is always below the interface level, then this can hinder the main flow exiting the tank. Even still further, these breakers put a limitation on the oxygen efficiency at the outlet, and the fixed geometry of these breakers cannot be adjusted between changes in operating conditions to improve efficiency. Thus, improved systems and methods for reducing the formation of a vortex at the outlet pipe of the separator are desired.

The present disclosure is directed to fluid vortex breaker systems and methods of injecting fluid into the outlet pipe in order to reduce and/or prevent any gas suction vortex that originates from the gas/liquid surface.

SUMMARY

Embodiments of the present invention are included to meet these and other needs.

In one aspect, described herein, a vortex breaker assembly comprises a vessel having a first fluid arranged therein, a first conduit coupled to the vessel, and a fluid source. The vessel includes an opening formed in an outer wall of the vessel through which the fluid is configured to selectively flow. The first conduit is configured to fluidically open into the vessel via the opening such that the first fluid is configured to flow from the vessel and into the first conduit via the opening. The first conduit includes at least one inlet formed in an outer wall of the first conduit and opening into the first conduit. The fluid source is configured to provide a second fluid to the at least one inlet. The second fluid flows into the first conduit from the at least one inlet at a predetermined flow momentum such that the second fluid interacts with the first fluid flowing from the vessel and through the first conduit so as to disrupt a flow field of the first fluid and minimize formation of a fluidic vortex of the first fluid at the opening of the vessel.

In some embodiments, the vortex breaker assembly may further comprise at least one inlet pipe fluidically coupled to the at least one inlet. The at least one inlet may be located proximate to a first end of the first conduit that is coupled to the vessel such that the at least one inlet is proximate to the opening of the vessel. The at least one inlet pipe may fluidically open into the first conduit via the at least one inlet. In some embodiments, the predetermined flow momentum of the second fluid flow into the first conduit may be constant over a predetermined period of time. In some embodiments, the opening of the vessel may be located on a bottom sidewall of the vessel such that the first fluid is configured to selectively drain through the opening. The first conduit may be substantially vertical so as to allow drainage of the first fluid from the vessel. In some embodiments, the predetermined period of time during which the predetermined flow momentum of the second fluid flow is constant may be a time period from when the first fluid begins draining through the opening to when the first fluid stops draining through the opening.

In some embodiments, the vortex breaker assembly may further comprise a first pump and a flow regulator valve located between and fluidically interconnecting the fluid source and the at least one inlet pipe, and a controller. The first pump and the flow regulator valve may be configured to control a velocity and a mass flow of the second fluid flow so as to control the flow momentum of the second fluid into the first conduit. The controller may be configured to control the first pump and the flow regulator valve so as to control the velocity and the mass flow of the second fluid flow. In some embodiments, a second pump may be fluidically connected to a second end of the first conduit opposite the first end of the pipe and located downstream of the opening of the vessel. The second pump may be configured to draw the first fluid from the vessel via the opening and the first conduit. In the second aspect of the present invention, the fluid source may be a polishing loop fluidically connected to an output of the second pump and fluidically connected to an input of the first pump such that the first fluid flows into the polishing loop, is treated via the polishing loop, and exits the polishing loop as the second fluid. In some embodiments, the vessel may be at least one of an oxygen separator or a hydrogen separator. The first fluid may be deionized water and the second fluid may be deionized water.

In some embodiments, the vortex breaker assembly may further comprise at least one inlet pipe fluidically coupled to the at least one inlet. The at least one inlet pipe may be arranged such that the second fluid flows against a direction of rotation of the fluidic vortex of the first fluid.

In some embodiments, the vortex breaker assembly may further comprise at least one inlet pipe fluidically coupled to the at least one inlet. The at least one inlet pipe may be arranged such that the second fluid flows with a direction of rotation of the fluidic vortex of the first fluid.

In some embodiments, the vortex breaker assembly may further comprise at least one inlet pipe fluidically coupled to the at least one inlet. The at least one inlet pipe may include a first inlet pipe arranged at a first position of the first conduit and a second inlet pipe arranged at a second position of the first conduit different than the first position. In some embodiments, the first inlet pipe and the second inlet pipe may be arranged diametrically opposite of each other on opposing sides of the first conduit.

According to a second aspect, described herein, a method of breaking a fluidic vortex comprises providing a first fluid within a vessel, the vessel including an opening formed in a sidewall of the vessel through which the first fluid is configured to selectively flow; coupling a first conduit to the vessel, wherein the first conduit opens into the vessel via the opening, such that the first fluid is configured to flow from the vessel and into the first conduit via the opening; forming at least one inlet in an outer wall of the first conduit, the at least one inlet opening into the first conduit; providing a second fluid from a fluid source to the at least one inlet; drawing the first fluid from the vessel and into the first conduit; and ejecting the second fluid into the first conduit at a predetermined flow momentum, such that the second fluid interacts with the first fluid flowing from the vessel and through the first conduit, so as to disrupt a flow field of the first fluid and minimize formation of a fluidic vortex of the first fluid at the opening of the vessel.

In some embodiments, the method may further comprise coupling at least one inlet pipe to the first conduit, wherein the at least one inlet pipe opening into the first conduit. The second fluid may flow through the at least one inlet pipe and into the first conduit via the at least one inlet. The predetermined flow momentum of the second fluid flow into the first conduit may be constant over a predetermined period of time. In some embodiments, the predetermined period of time during which the predetermined flow momentum of the second fluid flow is constant may be a time period from when the first fluid begins draining through the opening to when the first fluid stops draining through the opening. In some embodiments, the ejecting of the second fluid from the at least one inlet pipe into the first conduit may include ejecting the second fluid against a direction of rotation of the fluidic vortex of the first fluid.

In some embodiments, the ejecting of the second fluid from the at least one inlet pipe into the first conduit includes ejecting the second fluid with a direction of rotation of the fluidic vortex of the first fluid.

In some embodiments, the method may further comprise increasing a mass flow of the second fluid flowing through the at least one inlet pipe and decreasing a velocity of the second fluid flowing through the at least one inlet pipe via a first pump and a flow regulator valve located between and fluidically interconnecting the fluid source and the at least one inlet pipe such that the flow momentum of the second fluid remains constant. In some embodiments, the method may further comprise decreasing a mass flow of the second fluid flowing through the at least one inlet pipe and increasing a velocity of the second fluid flowing through the at least one inlet pipe via the first pump and the flow regulator valve such that the flow momentum of the second fluid remains constant.

In some embodiments, the at least one inlet pipe may include a first inlet pipe arranged at a first position of the first conduit and a second inlet pipe arranged at a second position of the first conduit different than the first position. A sum of a first flow momentum of the second fluid flowing through the first inlet pipe and a second flow momentum of the second fluid flowing through the second inlet pipe may be equal to the predetermined flow momentum.

BRIEF DESCRIPTION OF DRAWINGS

This disclosure will be more fully understood from the following detailed description taken in conjunction with the accompanying drawings, in which.

DETAILED DESCRIPTION

The present disclosure is directed to fluid vortex breaker systems, such as for electrolysis systems and methods of injecting fluid into an outlet pipe of a vessel. The present systems and methods of injecting fluids into a vessel are desired in order to reduce and/or prevent any gas suction vortex that originates from a gas/liquid surface located within the vessel. Therefore, the present disclosure is related to a fluid vortex breaker, assembly, and/or system 20 to improve water electrolysis.

Figure 2:
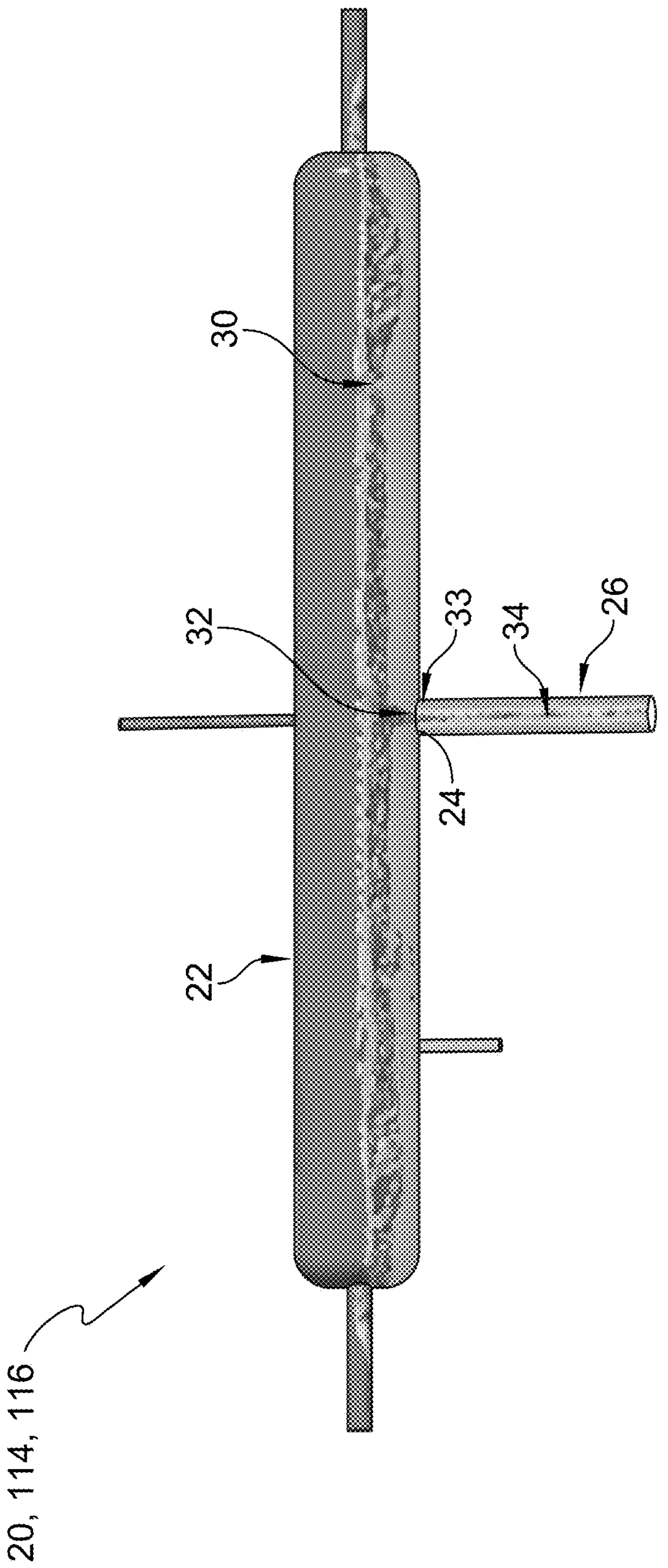
FIG. 2 is a side view of an exemplary oxygen separator of a fluid vortex breaker assembly of the present disclosure.
Figure 3A:
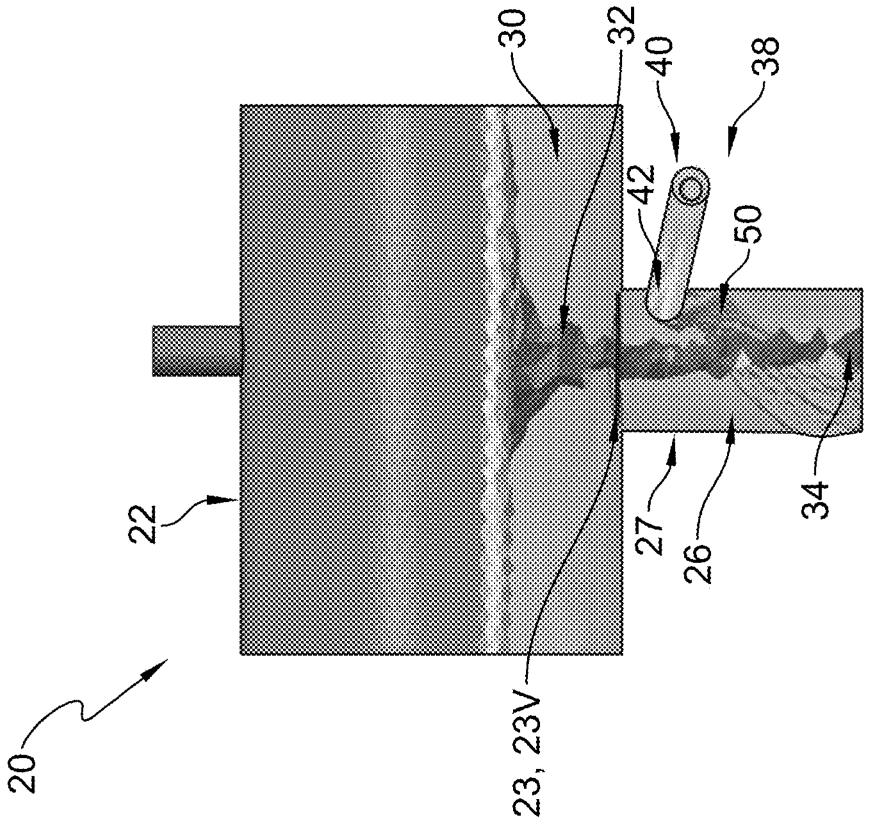
FIG. 3A is a side view of the fluid vortex breaker assembly of the present disclosure, showing that the assembly includes an inlet pipe configured to inject water into an outlet pipe that co-swirls with water drainage to reduce vortex formation.
Figure 3B:
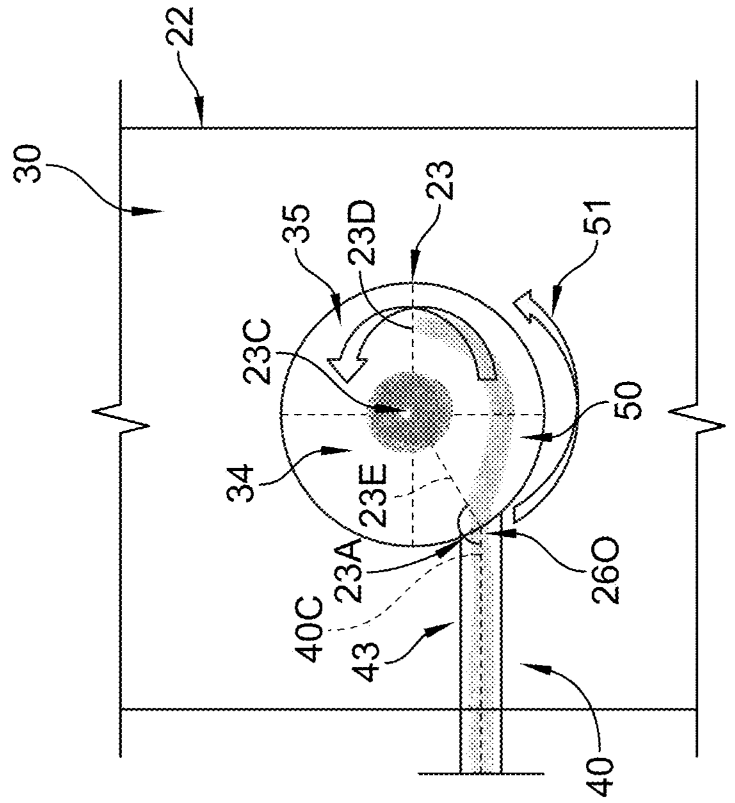
FIG. 3B is a top view of the fluid vortex breaker assembly of FIG. 3A.
Figure 4:
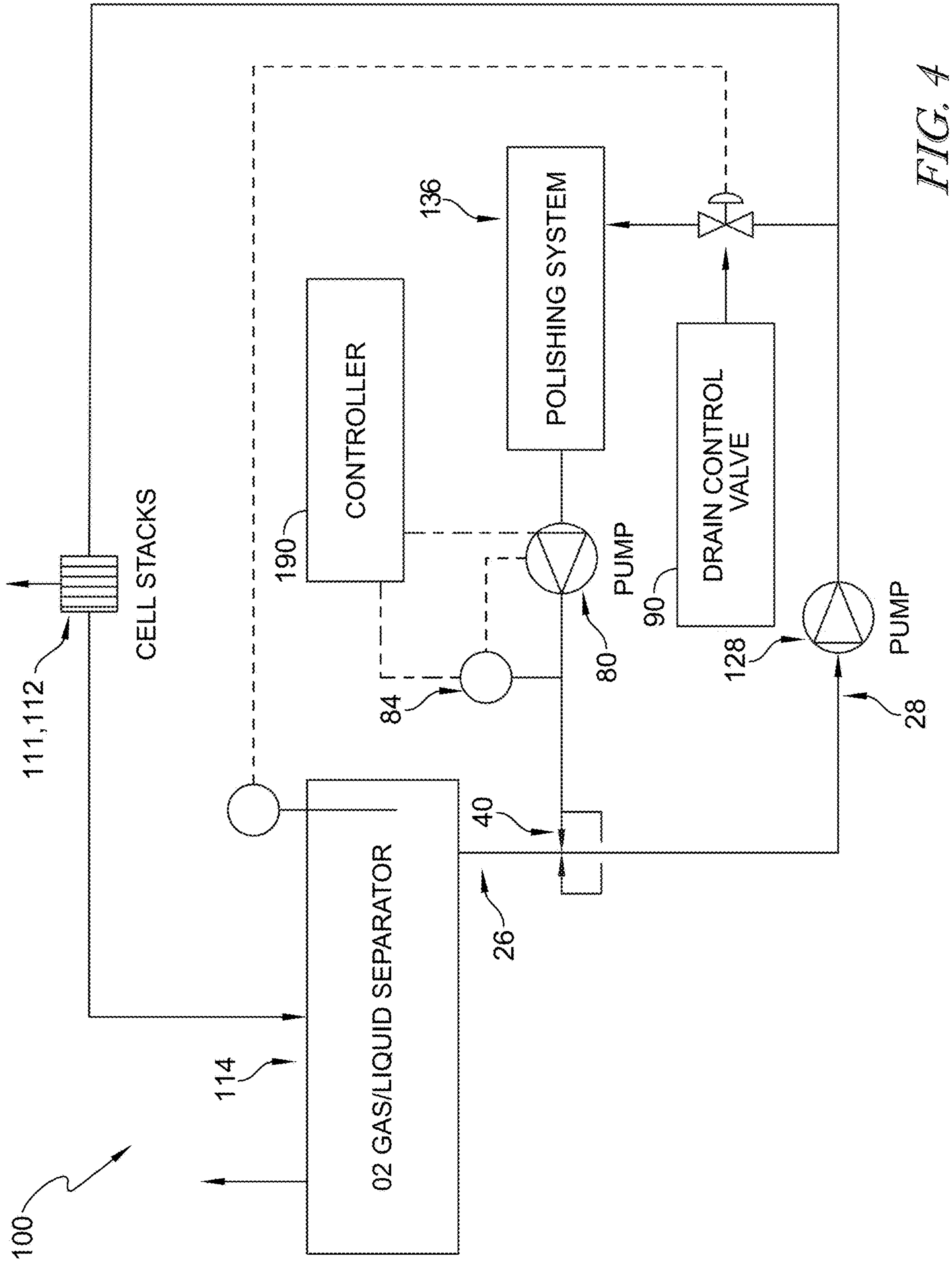
FIG. 4 is a detailed schematic view of the fluid vortex breaker assembly utilized in the exemplary electrolysis system of FIGS. 1A-1C, showing that a pump and a flow regulator valve control the water output of an inlet pipe into an outlet pipe.

According to a first aspect of the present disclosure as seen in FIG. 2, FIG. 3A, and FIG. 3B, a fluid vortex assembly 20 is configured to reduce the formation of a vortex 32 of a fluid 30 located within a vessel 22. The vortex 32 typically forms in the vessel 22 near an opening 23 of the vessel 22. In an illustrated embodiment, as shown in FIGS. 2-4, the vessel 22 includes an opening 23 formed in a bottom surface 24 of the vessel 22, and a fluid 30 disposed within the vessel 22.

An outlet pipe 26, which may also be referred to as a conduit, is coupled to the bottom surface 24 of the vessel 22 and opens into the vessel 22 via the opening 23, as shown in FIGS. 2-3B. In some embodiments, the conduit, or outlet pipe 26, is a hollow, cylindrical tube configured to transport fluid therein. In other embodiments, the conduit may be a separate tank coupled directly to the vessel 22, to which fluid stored in the vessel 22 may flow. A pump 128 positioned downstream of the outlet pipe 26 produces a downward suction of the fluid 30 out of the opening 23 through the outlet pipe 26, and out of the vessel 22. In doing so, a vortex 32 may be created at the top of a portion of the fluid flowing out of the opening 23 and into the outlet pipe 26, also referred to as an outlet portion 34 of the fluid 30 (see FIG. 2). As shown in greater detail in FIG. 2, the vortex 32 may form just below the water 30 level and at the top 33 of the outlet portion 34. The outlet portion 34 will begin to swirl within the outlet pipe 26, creating a whirlpool effect.

Referring to FIG. 3A, in order to minimize the formation of the vortex 32, at least one inlet pipe 40 is coupled to the outlet pipe 26 near the opening 23. The inlet pipe 40 is configured to inject fluid 50 into the outlet pipe 26 so as to create turbulence in the flow of the fluid 30 near the opening 23. The turbulence created by the addition of the inlet pipe 40 minimizes the formation of the vortex 32.

Figure 1A:
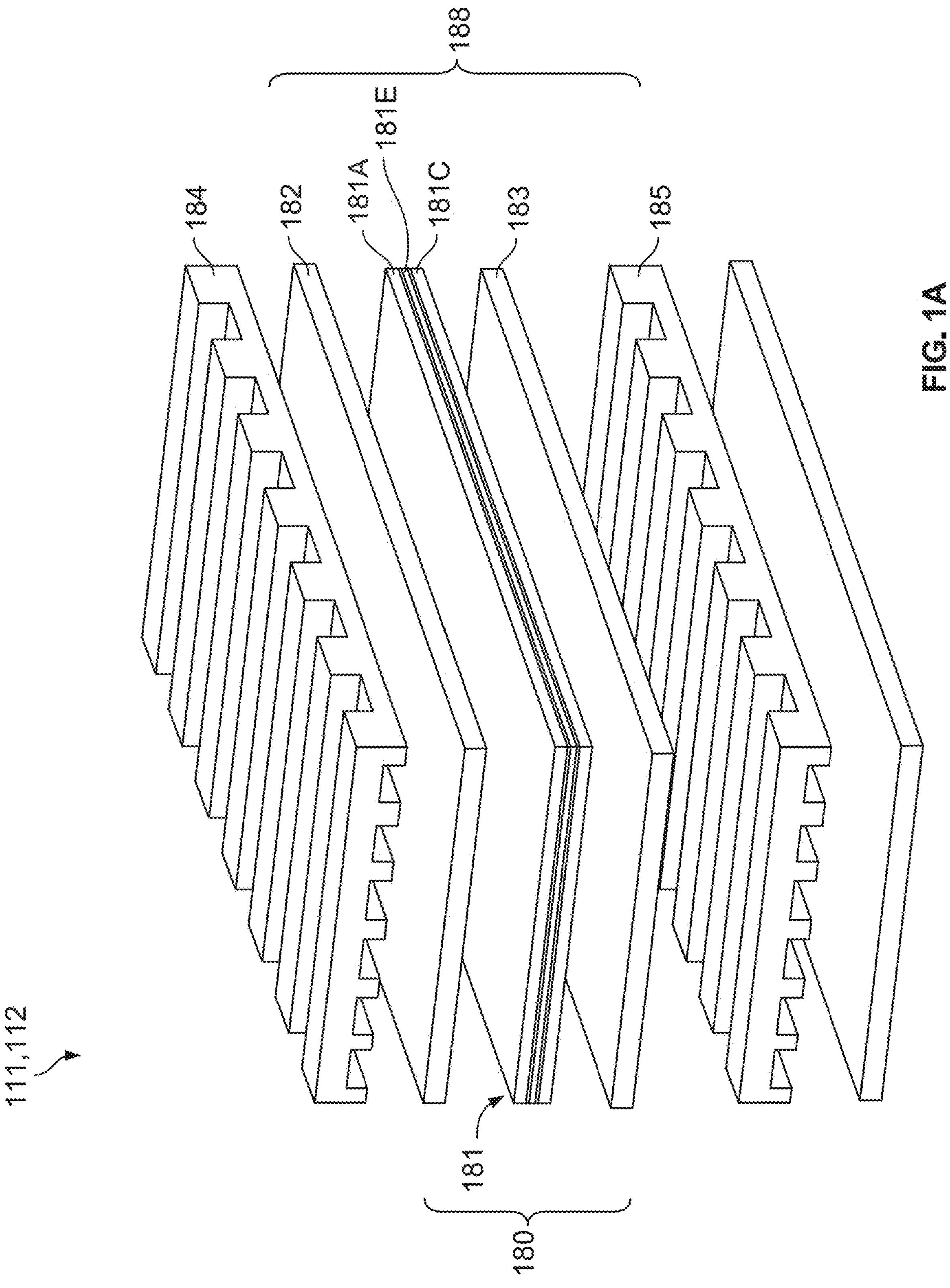
FIG. 1A is a perspective view of an electrolyzer cell stack according to the present disclosure.
Figure 1B:
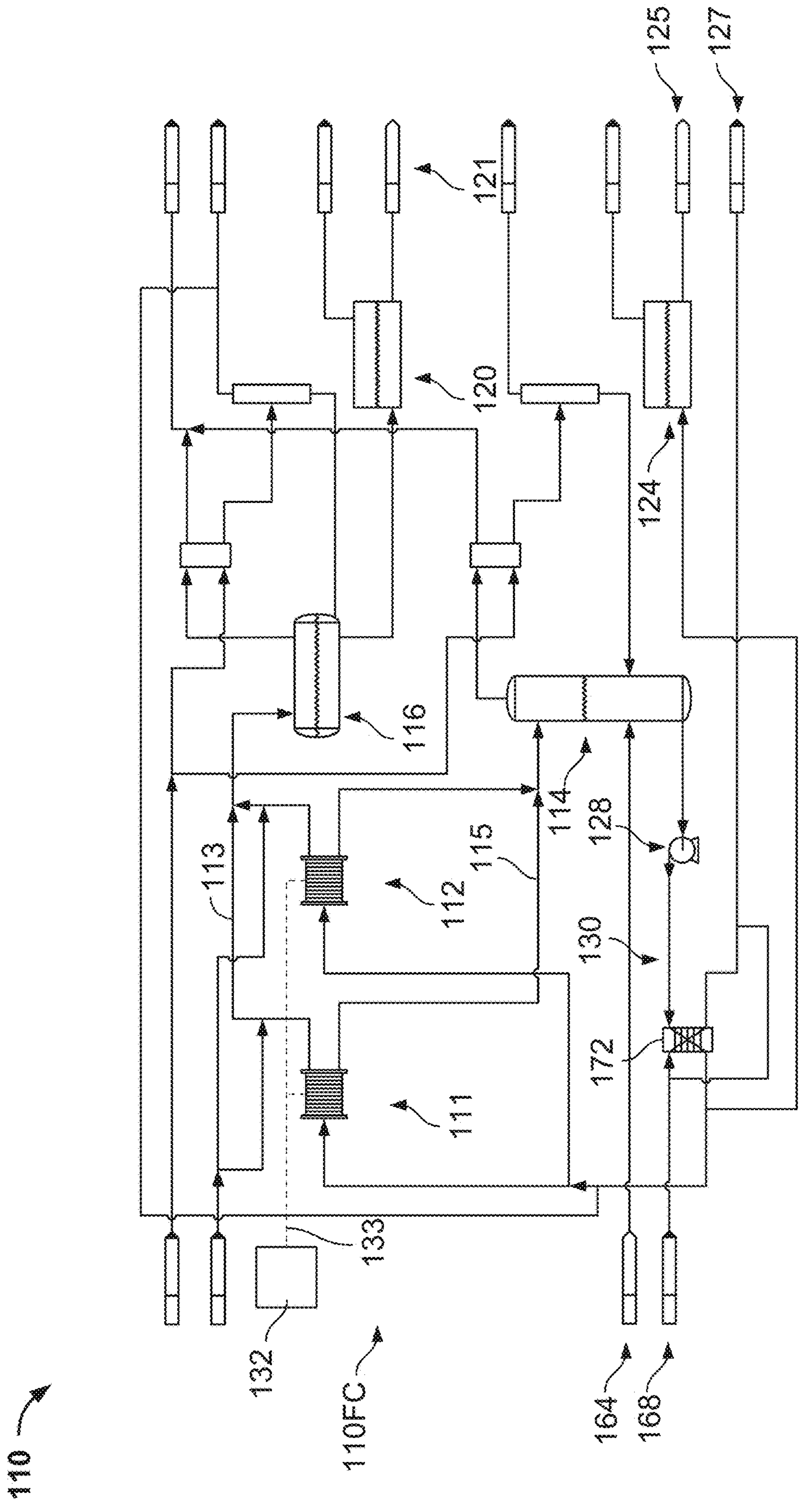
FIG. 1B is a schematic view of an electrolysis system configured to utilize the electrolyzer cell stack of FIG. 1A.
Figure 1C:
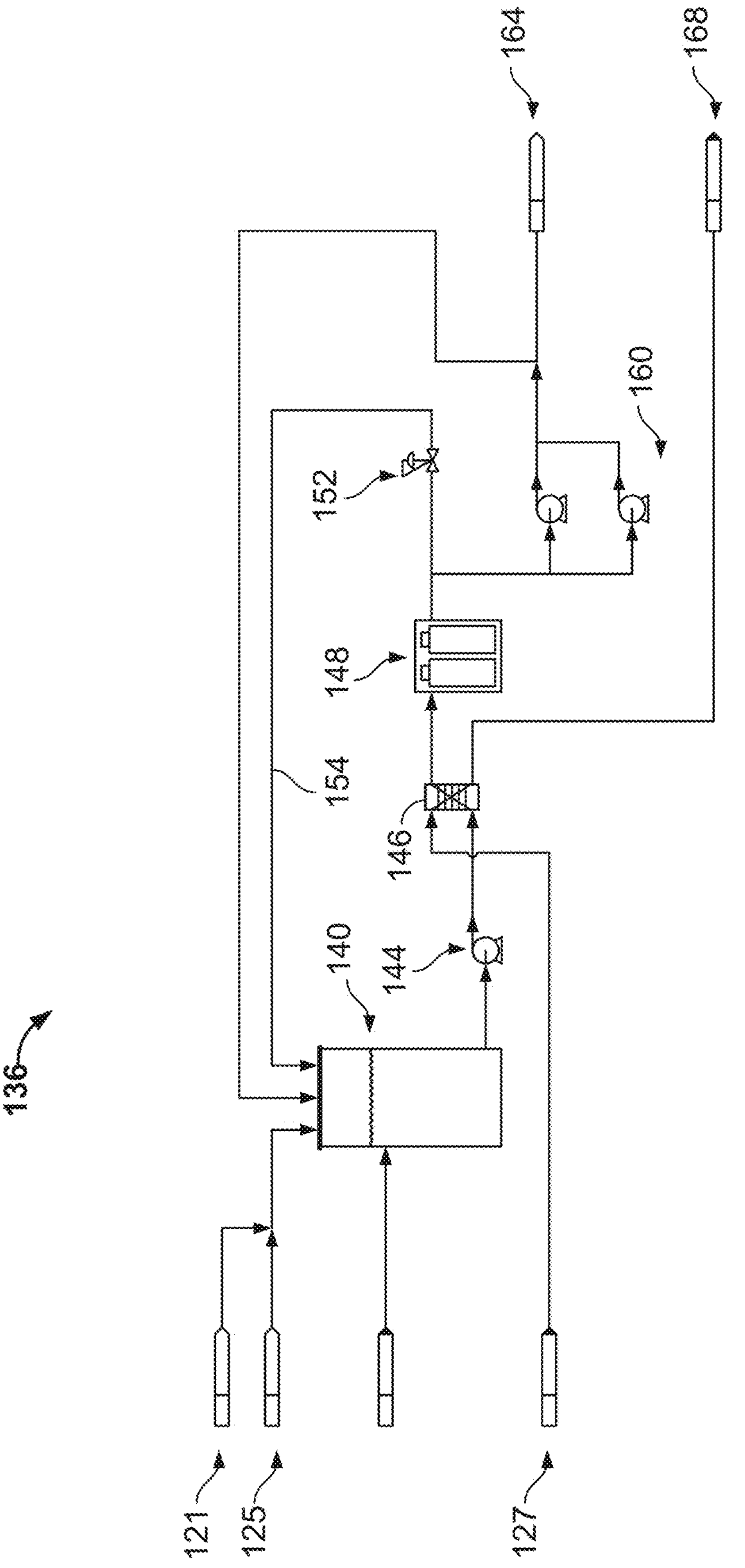
FIG. 1C is a schematic view of an additional portion of the electrolysis system of FIG. 1B.

The fluid vortex assembly 20 is configured to be utilized with liquid-containing vessels 22 of electrolysis systems, such as the oxygen separator 114 and the hydrogen separator 116 of the electrolysis system 110 shown in FIGS. 1A-1C. As shown in FIGS. 1A and 1B, electrolysis systems 110 are typically configured to utilize water and electricity to produce hydrogen and oxygen. An electrolysis system 110 typically includes one or more electrolyzer cells 180 that utilize electricity to chemically produce substantially pure hydrogen and oxygen, or oxygenated water 30 as shown in FIGS. 2-4, from deionized water 130. Often the electrical source for the electrolysis systems 110 is produced from power or energy generation systems, including renewable energy systems such as wind, solar, hydroelectric, and geothermal sources for the production of green hydrogen. In turn, the pure hydrogen produced by the electrolysis systems 110 is often utilized as a fuel or energy source for those same power generation systems, such as fuel cell systems. Alternatively, the pure hydrogen produced by the electrolysis systems 110 may be stored for later use.

The typical electrolyzer cell 180, or electrolytic cell, is comprised of multiple assemblies compressed and bound into a single assembly, and multiple electrolyzer cells 180 may be stacked relative to each other, along with bipolar plates (BPP) 184, 185 therebetween, to form an electrolyzer cell stack (for example, electrolyzer cell stacks 111, 112 in FIG. 1B). Each electrolyzer cell stack 111, 112 may house a plurality of electrolyzer cells 180 connected together in series and/or in parallel. The number of electrolyzer cell stack 111, 112 in the electrolysis systems 110 can vary depending on the amount of power required to meet the power need of any load (e.g., fuel cell stack). The number of electrolyzer cells 180 in an electrolyzer cell stack 111, 112 can vary depending on the amount of power required to operate the electrolysis systems 110 including the electrolyzer cell stack 111, 112.

An electrolyzer cell 180 includes a multi-component membrane electrode assembly (MEA) 181 that has an electrolyte 181E, an anode 181A, and a cathode 181C. Typically, the anode 181A, cathode 181C, and electrolyte 181E of the membrane electrode assembly (MEA) 181 are configured in a multi-layer arrangement that enables the electrochemical reaction to produce hydrogen and/or oxygen via contact of the water with one or more gas diffusion layers 182, 183. The gas diffusion layers (GDL) 182, 183, which may also be referred to as porous transport layers (PTL), are typically located on one or both sides of the MEA 181. Bipolar plates (BPP) 184, 185 often reside on either side of the GDLs and separate the individual electrolyzer cells 180 of the electrolyzer cell stack 111, 112 from one another. One bipolar plate 185 and the adjacent gas diffusion layers 182, 183 and MEA 181 can form a repeating unit 188.

As shown in FIGS. 1B and 1C, an exemplary electrolysis system 110 can include two electrolyzer cell stacks 111, 112 and a fluidic circuit 110FC including the various fluidic pathways shown in FIGS. 1B and 1C that is configured to circulate, inject, and purge fluid and other components to and from the electrolysis systems 110. A person skilled in the art would understand that one or a variety of a number of components within the fluidic circuit 110FC, as well as more or less than two electrolyzer cell stacks 111, 112, may be utilized in the electrolysis systems 110. For example, the electrolysis systems 110 may include one electrolyzer cell stack 111, and in other examples, the electrolysis systems 110 may include three or more electrolyzer cell stacks.

The electrolysis systems 110 may include one or more types of electrolyzer cell stacks 111, 112 therein. In the illustrated embodiment, a polymer electrolyte membrane (PEM) electrolyzer cell 180 may be utilized in the stacks 111, 112. A PEM electrolyzer cell 180 typically operates at about 4° C. to about 150° C., including any specific or range of temperatures comprised therein. A PEM electrolyzer cell 80 also typically functions at about 100 bar or less, but can go up to about 1000 bar (including any specific or range of pressures comprised therein), which reduces the total energy demand of the system. A standard electrochemical reaction that occurs in a PEM electrolyzer cell 180 to produce hydrogen is as follows.

Anode: $2H2O \rightarrow O2 + 4H+ + 4e-$

Cathode: $4H+ + 4e- \rightarrow 2H2$

Overall: $2H2O$ (liquid) $\rightarrow 2H2 + O2$

Additionally, a solid oxide electrolyzer cell 180 may be utilized in the electrolysis systems 110. A solid oxide electrolyzer cell 180 will function at about 500° C. to about 1000° C., including any specific or range of temperatures comprised therein. A standard electrochemical reaction that occurs in a solid oxide electrolyzer cell 180 to produce hydrogen is as follows.

Anode: $2O2 \rightarrow O2 + 4e-$

Cathode: $2H2O \rightarrow 4e- + 2H2 + 2O2-$

Overall: $2H2O$ (liquid) $\rightarrow 2H2 + O2$

Moreover, an AEM electrolyzer cell 180 may utilized, which uses an alkaline media. An exemplary AEM electrolyzer cell 180 is an alkaline electrolyzer cell 180. Alkaline electrolyzer cells 180 comprise aqueous solutions, such as potassium hydroxide (KOH) and/or sodium hydroxide (NaOH), as the electrolyte. Alkaline electrolyzer cells 180 typically perform at operating temperatures ranging from about 0° C. to about 150° C., including any specific or range of temperatures comprised therein. Alkaline electrolyzer cell 180 generally operate at pressures ranging from about 1 bar to about 100 bar, including any specific or range of pressures comprised therein. A typical hydrogen-generating electrochemical reaction that occurs in an alkaline electrolyzer cell 180 is as follows.

Anode: $4OH- \rightarrow O2 + 2H2O + 4e-$

Cathode: $4H2O + 4e- \rightarrow 2H2 + 4OH-$

Overall: 2 H2O 2H2 + O2

As shown in FIG. 1B, the electrolyzer cell stacks 111, 112 include one or more electrolyzer cells 180 that utilize electricity to chemically produce substantially pure hydrogen and oxygen from water. In turn, the pure hydrogen produced by the electrolyzer may be utilized as a fuel or energy source. As shown in FIG. 1B, the electrolyzer cell stack 111, 112 outputs the produced hydrogen along a fluidic connecting line 113 to a hydrogen separator 116, and also outputs the produced oxygen, or oxygenated water 30 as shown in FIGS. 2-4, along a fluidic connecting line 115 to an oxygen separator 114.

The hydrogen separator 116 may be configured to output pure hydrogen gas and also send additional output fluid to a hydrogen drain tank 120, which then outputs fluid to a deionized water drain 121. The oxygen separator 114 may output fluid to an oxygen drain tank 124, which in turn outputs fluid to a deionized water drain 125. A person skilled in the art would understand that certain inputs and outputs of fluid may be pure water or other fluids such as coolant or byproducts of the chemical reactions of the electrolyzer cell stacks 111, 112. For example, oxygen and hydrogen may flow away from the cell stacks 111, 112 to the respective separators 114, 116. The system 110 may further include a rectifier 132 configured to convert electricity 133 flowing to the cell stacks 111, 112 from alternating current (AC) to direct current (DC).

The deionized water drains 121, 125 each output to a deionized water tank 140, which is part of a polishing loop 136 of the fluidic circuit 110FC, as shown in FIG. 1C. Water with ion content can damage electrolyzer cell stacks 111, 112 when the ionized water interacts with internal components of the electrolyzer cell stacks 111, 112. The polishing loop 136, shown in greater detail in FIG. 1C, is configured to deionize the water such that it may be utilized in the cell stacks 111, 112 and not damage the cell stacks 111, 112.

In the illustrated embodiment, the deionized water tank 140 outputs fluid, in particular water, to a deionized water polishing pump 144. The deionized water polishing pump 144 in turn outputs the water to a water polishing heat exchanger 146 for polishing and treatment. The water then flows to a deionized water resin tank 148.

Coolant is directed through the electrolysis systems 110, in particular through a deionized water heat exchanger 172 that is fluidically connected to the oxygen separator 114. The coolant used to cool said water may also be subsequently fed to the water polishing heat exchanger 146 via a coolant input 127 for polishing. The coolant is then output back to the deionized water heat exchanger 172 for cooling the water therein.

After the water is output from the deionized water polishing heat exchanger 146 and subsequently to the deionized water resin tank 148, a portion of the water may be fed to deionized water high pressure feed pumps 160. Another portion of the water may be fed to a deionized water pressure control valve 152, as shown in FIG. 1C. The portion of the water that is fed to the deionized water pressure control valve 152 flows through a recirculation fluidic connection 154 that allows the water to flow back to the deionized water tank 140 for continued polishing.

In some embodiments, the electrolysis systems 110 may increase deionized water skid for polishing water flow to flush out ions within the water at a faster rate. The portion of the water that is fed to the deionized water high pressure feed pumps 160 is then output to a deionized water feed 164, which then flows into the oxygen separator 114 for recirculation and eventual reusage in the electrolyzer cell stacks 111, 112. This process may then continuously repeat.

The electrolysis systems 110 described herein, may be used in stationary and/or immovable power system, such as industrial applications and power generation plants. The electrolysis systems 110 may also be implemented in conjunction with other electrolysis systems 10.

The present electrolysis systems 110 may be comprised in stationary or mobile applications. The electrolysis systems 110 may be in a vehicle or a powertrain. A vehicle or powertrain comprising the electrolysis systems 110 may be an automobile, a pass car, a bus, a truck, a train, a locomotive, an aircraft, a light duty vehicle, a medium duty vehicle, or a heavy duty vehicle.

In addition, it may be appreciated by a person of ordinary skill in the art that the electrolysis system 110, electrolyzer stack 111, 112, and/or the electrolyzer cell 180 described in the present disclosure may be substituted for any electrochemical system, such as a fuel cell system, a fuel cell stack, and/or a fuel cell (FC), respectively. As such, in some embodiments, the features and aspects described and taught in the present disclosure regarding electrolysis system 110, electrolyzer stack 111, 112, and/or the electrolyzer cell 180 also relate a fuel cell system, a fuel cell stack, and/or a fuel cell (FC), respectively. In further embodiments, the features and aspects described or taught in the present disclosure do not relate, and are therefore distinguishable from, those of a fuel cell system, a fuel cell stack, and/or a fuel cell (FC).

In the illustrated embodiment as shown in FIGS. 2-4, the vessel 22 is the oxygen separator 114 of the system 100. Notably, a person skilled in the art would understand that the vessel 22 may be the hydrogen separator 116 or any other similar vessel, device, apparatus, and/or component in which minimization of vortex formation of the liquid contained therein is performed. As shown in FIG. 2, the vessel 22 of the fluid vortex breaker assembly 20 includes a generally elongated shape, which may be cylindrical. The cylindrical shape creates a rounded bottom surface 24 of the vessel 22, which allows the water 30 to naturally flow toward the opening 23 formed in the bottom surface 24 as the water 30 level lowers.

As shown in FIG. 1B, oxygenated water 30 from the electrolyzer cell stack 111, 112 flows to the vessel 22 in order to undergo oxygen gas separation. As shown in FIGS. 2 and 3A, the vessel 22 further includes the opening 23 through which the water 30 may exit the vessel 22. The opening 23 is formed in a sidewall 24 of the vessel 22. In the illustrated embodiment, the sidewall 24 is a bottom surface 24 of the vessel 22 such that the opening 23 provides drainage of the water 30 from the vessel 22. In some embodiments, the vessel 22 may include a valve 23V or other known mechanism for selectively controlling the drainage rate of the water 30 out of the opening 23 (see FIG. 3A).

The fluid vortex breaker assembly 20 further includes the outlet pipe 26, also referred to as a first conduit, coupled to the bottom surface 24 of the vessel 22 at a first end 27 of the outlet pipe 26, as shown in FIGS. 2 and 3A. The outlet pipe 26 is configured to fluidically open into the vessel 22 via the opening 23 such that the water 30 is configured to flow from the vessel 22 and into the outlet pipe 26 via the opening 23.

As shown in FIGS. 2 and 3A, the outlet pipe 26 is formed as a straight, entirely cylindrical pipe that extends downwardly away from the vessel 22. In some embodiments, the outlet pipe 26 may include curved portions downstream of the first end 27. As shown in FIG. 4, the pump 128 may be coupled to a second end 28 of the outlet pipe 26 opposite the first end 27. As can be seen in FIG. 1B and FIGS. 2-4, due to the pump 128 drawing the water 30 out of the vessel 22 and into the outlet pipe 26, a vortex 32 in the water 30 may be created near the opening 23 and the first end 27 of the outlet pipe 26 in the outlet portion 34 of the water 30. In other embodiments, the pump 128 may not necessary based on the design of the vessel 22 and the method in which fluid is drawn out of the vessel 22. In such embodiments, a single pump may be utilized with two lines and two control valves for balancing flows from the multiple lines/pipes.

In order to minimize the formation of the vortex 32 as much as possible, the fluid vortex breaker assembly 20 further includes a second fluid inlet assembly 38 configured to inject additional fluid 50, also referred to second fluid 50, into the outlet pipe 26 at the first end 27 (see FIGS. 3A and 3B). The second fluid 50 interacts with the water 30 flowing out of the opening 23, causes turbulence, and thus reduces formation of the vortex 32 within the water 30. In order to deliver the second fluid 50 to the outlet pipe 26, the second fluid inlet assembly 38 includes at least one inlet opening 42 formed in the outlet pipe 26 proximate to the opening 23. In some embodiments, the opening 42 is formed as a hole 260 is the side of the cylindrical outlet pipe 26 (see FIG. 3B).

In the illustrated embodiment, the second fluid inlet assembly 38 includes at least one inlet pipe 40 coupled to an outer surface of the cylindrical outlet pipe 26, as shown in FIGS. 3A and 3B. The inlet pipe 40 is configured to fluidically open into the outlet pipe 26 via the inlet opening 42 and deliver the second fluid 50 to the outlet pipe 26. The assembly 20 further includes a fluid source 136 for the second fluid to supply the second fluid 50 to the inlet pipe 40. In some embodiments, the fluid source 136 may be the polishing loop 136 described above, as shown in FIG. 1B and FIG. 4.

In embodiments in which the fluid source 136 is the polishing loop 136, the second fluid 50 is water that is continuously being recirculated in the system 100. As can be seen in FIG. 1B, the water may be output from the electrolyzer cell stack 111, 112, output from the hydrogen separator 116, and subsequently polished and deionized in the polishing loop 136. This water is then sent through the pump 80 to the inlet pipe 40 for injection into the outlet pipe 26, as shown in FIG. 4. Moreover, as also shown in FIG. 4, the water 30 from the vessel 22, after having been drawn through the pump 128 and sent to the polishing loop 136, may then be sent through the pump 80 and to the inlet pipe 40 for injection into the outlet pipe 26.

In other embodiments, alternative second fluid sources may be utilized to provide different types of fluid to the outlet pipe 26 in order to alter the vortex reduction properties. In some embodiments, the fluid source 136 may be an alternative fluid source that supplies fresh make up water, which is consumed in the electrolysis process and is also added into the polishing circuit 136. In some embodiments, the second fluid 50 includes substantially equal or lower dissolved gas content than the fluid 30, or water, stored in the vessel 22. A person skilled in the art will understand that it would be undesirable to pump lower quality, higher gas content water into the outlet pipe 26, as it would be detrimental to the gas separation step.

Referring to FIG. 3B, the inlet pipe 40 may be a cylindrical pipe or have any shape that is sized to have a smaller diameter than the diameter of the outlet pipe 26. This sizing ensures that the second fluid 50 may be precisely directed into the outlet pipe 26 at a desired angle. In this way, the inlet pipe 40 ejects the second fluid 50 at a precise direction to interact with the outlet portion 34 of the water 30 flow.

The end portion 43 of the inlet pipe 40 located near the inlet 42 may be formed to be substantially straight so as to allow for direct and constant flow of water 30 in the desired direction into the outlet pipe 26, as shown in FIG. 3B. The inlet pipe 40 is also arranged proximate to the bottom surface 24 of the vessel 22 near the top of the first end 27 of the outlet pipe 26. This allows for optimal breakage of the vortex 32 at the opening 23 and/or the first end 27 of the outlet pipe 26.

In some embodiments, the outlet pipe 26 is sized to have a diameter of approximately 200 mm to 400 mm, including any specific or range of diameter comprised therein. The inlet pipe 40 is sized to have a diameter of approximately 20 mm to 40 mm, including any specific or range of diameter comprised therein. In the illustrated embodiment, the diameter of the outlet pipe 26 is approximately 300 mm and the diameter of the inlet pipe 40 is approximately 36 mm.

A person skilled in the art will understand that the dimensions of the outlet pipe 26 and the inlet pipe(s) 40 disclosed herein may be adjusted to accommodate size and design requirements of the particular vessel or separator being utilized. As will be discussed in greater detail below, the sizing may be adjusted so long as the velocity and mass flow of the fluid and/or water flowing through the inlet pipe 40 is adjusted to the desired momentum (momentum=velocity*mass).

In the illustrated embodiment, the inlet pipe 40 is coupled to the outlet pipe 26 such that the second fluid 50 being ejected from the inlet pipe 40 and into the outlet pipe 26 enters and rotates around the outlet pipe 26 in a direction 51 is the same as a direction 35 of a swirl of the outlet portion 34 of the water 30 caused by drainage and suction of the pump 128, as shown in FIG. 3B. In order to achieve this direction 51 of flow of the second fluid 50 in the same direction 35 of the water 30, the inlet pipe 40 is coupled to the outlet pipe 26 in one or more particular arrangements to facilitate this flow.

For example, in the illustrated embodiment, the inlet pipe 40 is arranged such that a central longitudinal axis 40C of the pipe 40 is parallel with a central diametrical line 23D extending through the center 23C of the opening 23, as shown in FIG. 3B. The inlet pipe 40 is offset from the central diametrical line 23D extending through the center 23C, such that it couples to the lower-left quadrant of the opening 23 as viewed in FIG. 3B. This arrangement causes the second fluid 50 to flow into the outlet pipe 26 next to the outlet portion 34 of the water 30 and with the rotation of the swirl of the water 30 instead of directly into the outlet portion 34. In other words, the central axis 43C of the inlet pipe 40 intersects a central diametric axis 23E of the openings 23 extending through the center 23C of the opening 23. The angle 23A formed between the axis 43C and the axis 23E must be below 180 degrees, as shown in FIG. 3B, such that the second fluid 50 is always flowing next to the outlet portion 34 and not directly into the outlet portion 34.

Because the second fluid 50 is flowing next to the outlet portion 34 of the swirling water 30 in the outlet pipe 26, the second fluid 50 can flow around and then join with the outlet portion 34 in the direction 51 of flow shown in FIG. 3B. This direction 51 is the same as the direction 35 of the swirl of the outlet portion 34. This co-swirling behavior of the second fluid 50 and the water 30 will disrupt the flow field, cause turbulence, and thus will reduce any gas suction vortex 32 that originated from the gas/liquid surface of the water 30.

In order to control the level of vortex reduction, the flow of the second fluid 50 by the inlet pipe 40 may be adjusted so as to achieve a constant predetermined flow momentum. When the constant predetermined flow momentum of the second fluid 50 flow is achieved, the second fluid 50 is enabled to interact with the outlet portion 34 of the water 30 in the outlet pipe 26 so as to create the desired amount of flow field disruption or turbulence, thus minimizing formation of the vortex 32 by a desired amount at the opening 23 of the vessel 22. The constant flow of the second fluid 50 advantageously provides for consistent and continuous destruction of the vortex 32.

Referring to FIG. 4, in order to control the momentum of the second fluid 50 flowing into the outlet pipe 26, the fluid vortex breaker assembly 20 further includes a pump 80 and a flow regulator valve 84 arranged upstream of the inlet pipe 40. The pump 80 and flow regulator valve 84, together, are configured to adjust the velocity and mass flow of the second fluid 50 before the fluid 50 reaches the inlet pipe 40. Thus, when the fluid 50 flows through the inlet pipe 40 and subsequently enters the outlet pipe 26 and interacts with the water 30 therein, the fluid 50 is flowing at the desired predetermined momentum so as to optimize the reduction of the vortex 32 formation. In the illustrated embodiment of FIG. 4, the pump 80 and the flow regulator valve 84 are located between and fluidically interconnect the fluid source, e.g. the polishing loop 136, and the inlet pipe 40.

In other embodiments, the fluid vortex breaker assembly 20 may only include a frequency-controlled pump 80 without a flow regulator valve 84, also referred to as a variable speed drive pump. The frequency-controlled pump 80 is configured to pump the second fluid 50 with an adjustable pumping speed so as to precisely control the velocity and mass flow of the fluid 50. The frequency-controlled pump 80 also includes additional sensors to measure the flow of the fluid 50 such that the pumping speed may be adjusted accordingly.

The second fluid 50 flow is kept constant over a predetermined period of time in order to consistently and continuously reduce the vortex 32 formation, thus optimizing system performance. In some embodiments, the predetermined period of time during which the predetermined flow momentum of the second fluid 50 flow is constant is a time period from when the water 30 begins draining through the opening 23 to when the water 30 stops draining through the opening 23. A person skilled in the art will understand that the predetermined period of time during which the predetermined flow momentum of the second fluid 50 flows may be any time period during which it is desired to minimize the vortex 32 formation.

In some embodiments, a controller 190 is operatively connected to the pump 80 and/or the flow regulator valve 84, as shown in FIG. 4. The controller 190 is configured to control the pump 80 and/or the flow regulator valve 84 so as to control the velocity and/or the mass flow of the second fluid 50 flow. The velocity and mass flow of the second fluid 50 out of the inlet pipe 40 should be high enough to cause flow field disruption and/or turbulence, and thus break up the vortex 32. In some embodiments, such as those only utilizing a frequency-controlled pump 80, the controller 190 is configured to set the pump speed of the pump 80.

In some embodiments, the velocity of the second fluid 50 may be in a range of 0.5 m/s to 20 m/s, including any specific or range of velocity comprised therein. In some embodiments, the velocity of the second fluid 50 may be in a range of 3 m/s to 6 m/s. In some embodiments, the velocity of the second fluid 50 may be approximately 4.5 m/s.

The controller 190 may automatically operate the pump 80 and valve 84 based on predetermined parameters or operating conditions. In some embodiments, the controller 190 may include a memory and a processor. The memory and processor are in communication with each other. The processor may be embodied as any type of computational processing tool or equipment capable of performing the functions described herein.

For example, the processor may be embodied as a single or multi-core processor(s), digital signal processor, microcontroller, or other processor or processing/controlling circuit. The memory may be embodied as any type of volatile or non-volatile memory or data storage capable of performing the functions described herein. Moreover, the controller 190 may also include additional and/or alternative components, such as those commonly found in a computer (e.g., various input/output devices). In other embodiments, one or more controllers 190 of components may be incorporated in, or otherwise form a portion of, another component. For example, the memory, or portions thereof, may be incorporated in the processor.

In operation, the memory may store various data and software used during operation of the controller 190 such as operating systems, applications, programs, libraries, and drivers. The memory is communicatively coupled to the processor via an I/O subsystem, which may be embodied as circuitry and/or components to facilitate input/output operations with the processor, the memory, and other components of the controller 190. In one embodiment, the memory may be directly coupled to the processor, for example via an integrated memory controller hub. Additionally, in some embodiments, the I/O subsystem may form a portion of a system-on-a-chip (SoC) and be incorporated, along with the processor, the memory, and/or other components of the controller 190, on a single integrated circuit chip (not shown).

A communication network may utilized to communicate between components such as between the controller 190 and the pump 80 and valve 84. The network may be configured to use any one or more communication technologies (e.g., wired, wireless and/or power line communications) and associated protocols (e.g., Ethernet, InfiniBand®, Bluetooth®, Wi-Fi®, WiMAX, 3G, 4G LTE, 5G, etc.) to effect such communication among and between system components and devices.

Figure 5B:
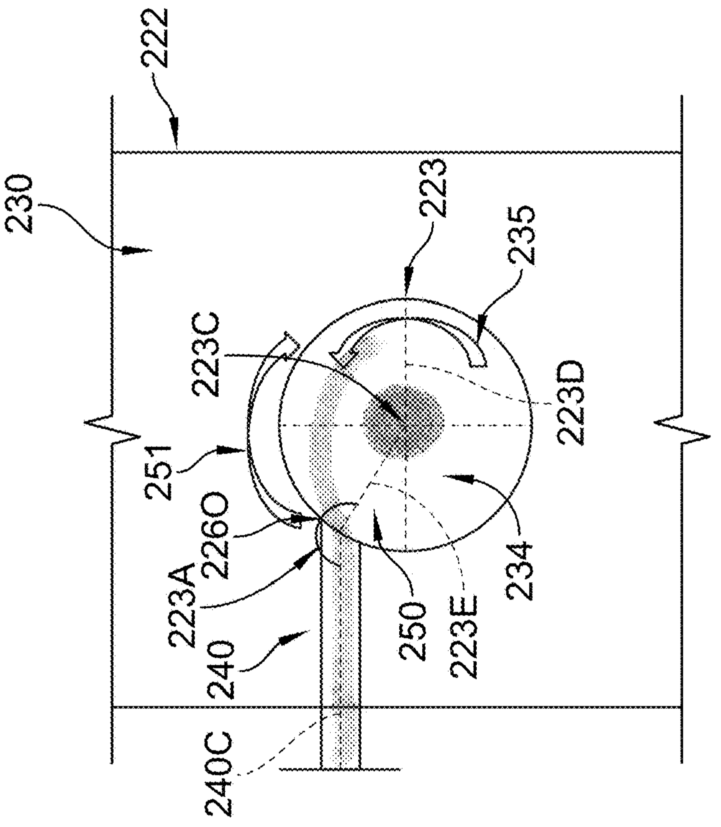
FIG. 5B is a top view of the fluid vortex breaker assembly of FIG. 5A.
Figure 5A:
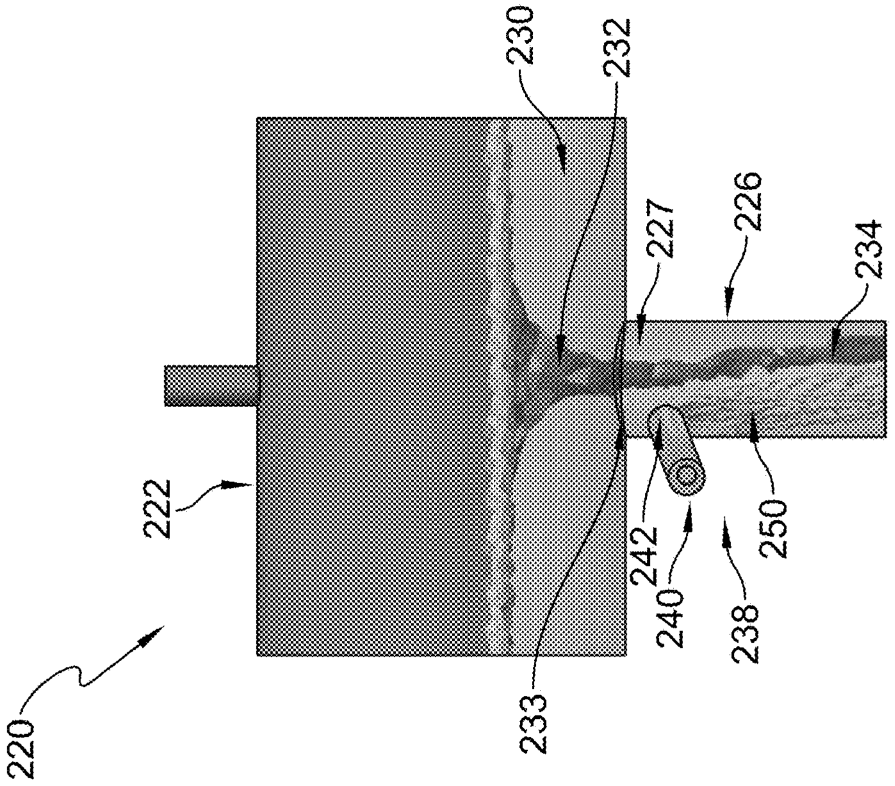
FIG. 5A is a side view of a fluid vortex breaker assembly according to a further aspect of the present disclosure, showing an embodiment of the assembly that includes an inlet pipe configured to inject water into an outlet pipe that swirls against the swirl direction of water drainage to reduce vortex formation.

Another embodiment of a fluid vortex breaker assembly 220 in accordance with the present disclosure is shown in FIG. 5A and FIG. 5B. The fluid vortex breaker assembly 220 is configured to be utilized in the electrolysis system 100 and is substantially similar to the fluid vortex breaker assembly 20 described herein. Accordingly, similar reference numbers in the 200 series indicate features that are common between the fluid vortex breaker assembly 220 and the fluid vortex breaker assembly 20. The description of the fluid vortex breaker assembly 20 is incorporated by reference to apply to the fluid vortex breaker assembly 220, except in instances when it conflicts with the specific description and the drawings of the fluid vortex breaker assembly 220.

The fluid vortex breaker assembly 220 is formed substantially similar to the fluid vortex breaker assembly 20 and includes similar components as those described above, including the vessel 222, the opening 223, the outlet pipe 226, the water 230, and the second fluid inlet assembly 238 having an inlet pipe 240, as shown in FIG. 5A. The assembly 220 differs from the assembly 20 described above in that the inlet pipe 240 is coupled to the outlet pipe 226 on the opposite side of the outlet pipe 226 as the inlet pipe 40 such that the second fluid 250 flows in a direction 251 against the direction 235 of the swirl of the outlet portion 234 of the water 230.

In particular, the inlet pipe 240 is arranged such that a central longitudinal axis 240C of the pipe 240 is parallel with a central diametrical line 223D extending through the center 223C of the opening 223, as shown in FIG. 5B. The inlet pipe 40 is offset from the central diametrical line 223D extending through the center 223C in an upward direction as viewed in FIG. 5B. In other words, the inlet pipe 240 couples to the upper-left quadrant of the cross-section of the opening 223 as viewed in FIG. 5B such that the second fluid 250 flows into the outlet pipe 226 next to the outlet portion 234 of the water 230 instead of directly into the outlet portion 234. The central axis 243C of the inlet pipe 240 intersects a central diametric axis 223E of the opening 223 extending through the center 223C of the opening 223. The angle 223A formed between the axis 243C and the axis 223E should be greater than 180 degrees, as shown in FIG. 5B, such that the second fluid 250 is always flowing next to the outlet portion 234 and not directly into the outlet portion 234.

The second fluid 250 may thus flow next to swirling outlet portion 234 of the water 230 in the outlet pipe 226 in a direction 251 opposite of the swirl direction 235 of the outlet 234 of the water 230, as shown in FIG. 5B. This anti-swirling behavior of the second fluid 250 relative to water 230 will cause flow field disruption and/or turbulence, and thus will reduce any gas suction vortex 232 that originated from the gas/liquid surface of the water 230. Similar to the fluid vortex breaker assembly 20 described above, the velocity and mass flow of the second fluid 250 are controlled so as to achieve a desired momentum by the pump 80 and the flow regulator valve 84. Each of the pump 80 and valve 84 may be controlled by the controller 190 such that the momentum of the second fluid 250 remains constant over a desired period of time.

Figure 6B:
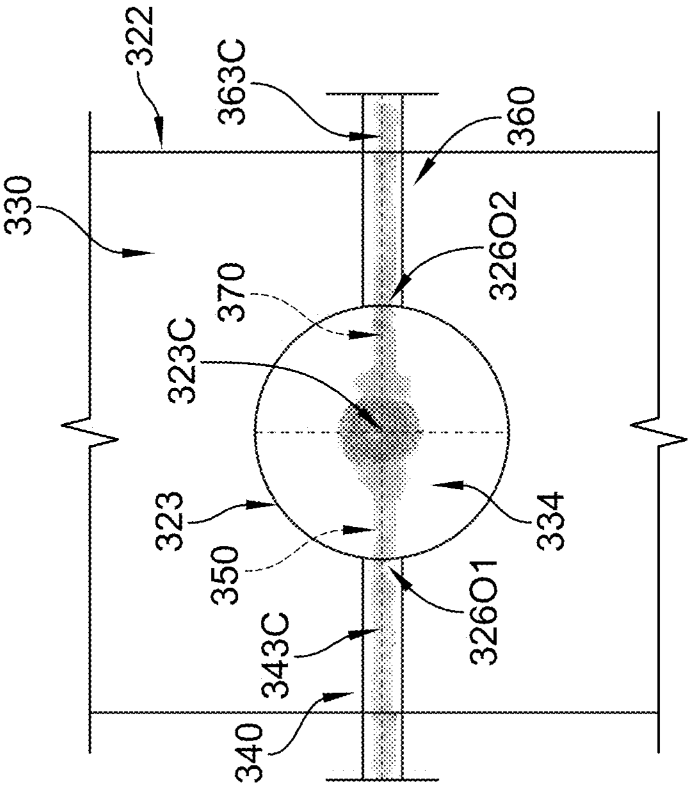
FIG. 6B is a top view of the fluid vortex breaker assembly of FIG. 6A.
Figure 6A:
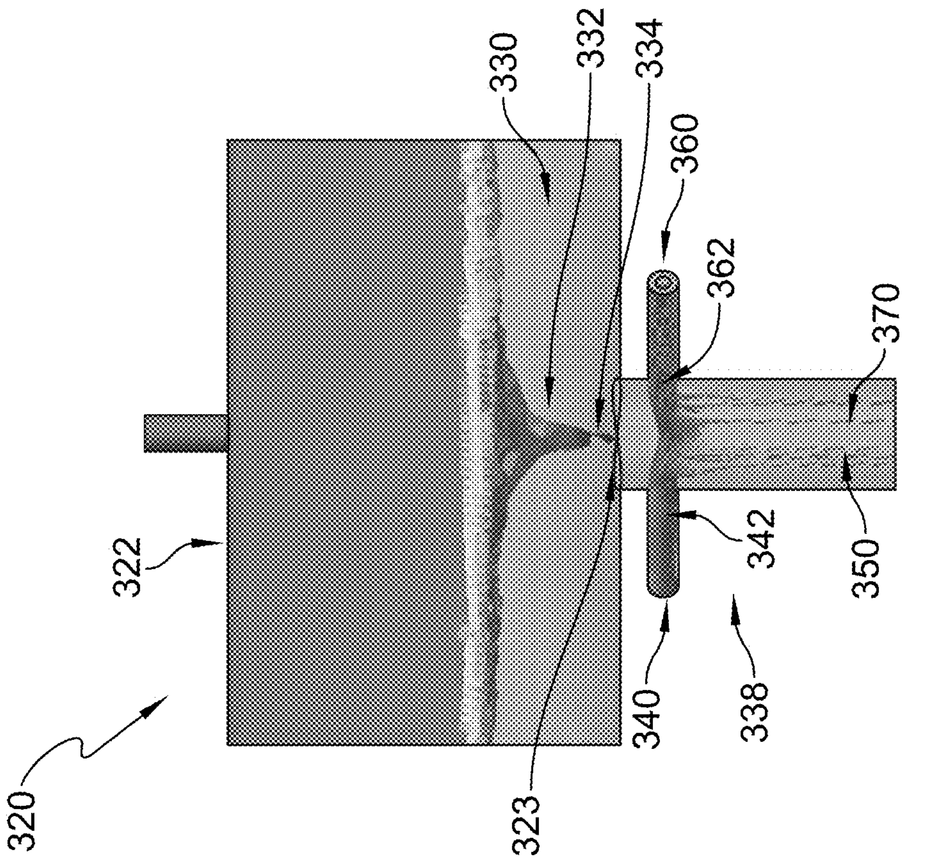
FIG. 6A is a side view of a fluid vortex breaker assembly according to a further aspect of the present disclosure, showing an embodiment of the assembly that includes two inlet pipes configured to inject water into the outlet pipe to reduce vortex formation.

Another embodiment of a fluid vortex breaker assembly 320 in accordance with the present disclosure is shown in FIG. 6A and FIG. 6B. The fluid vortex breaker assembly 320 is configured to be utilized in the electrolysis system 100 and is substantially similar to the fluid vortex breaker assemblies 20, 220 described herein. Accordingly, similar reference numbers in the 300 series indicate features that are common between the fluid vortex breaker assembly 320 and the fluid vortex breaker assemblies 20, 220. The descriptions of the fluid vortex breaker assemblies 20, 220 are incorporated by reference to apply to the fluid vortex breaker assembly 320, except in instances when it conflicts with the specific description and the drawings of the fluid vortex breaker assembly 320.

The fluid vortex breaker assembly 320 is formed substantially similar to the fluid vortex breaker assemblies 20, 220 and includes similar components as those described above, including the vessel 322, the opening 323, the outlet pipe 326, the water 330, and the second fluid inlet assembly 338, as shown in FIG. 6A. The assembly 320 differs from the assemblies 20, 220 described above in that the second fluid inlet assembly 338 includes two inlet pipes 340, 360 is coupled to the outlet pipe 326 on opposing sides of the outlet pipe 326. A second fluid 350 is provided through the first inlet pipe 340 and a third fluid 370 is provided through the second inlet pipe 360 such that the second and third fluids 350, 370 both flow into the outlet pipe 326 to cause the flow field disruption and/or turbulence that breaks up the vortex 332 in the water 330.

In the illustrated embodiment, the first inlet pipe 340 is arranged such that a central longitudinal axis 340C of the first inlet pipe 340 is parallel and aligned with a central longitudinal axis 360C of the second inlet pipe 360, as shown in FIG. 6B. As such, the first and second inlet pipes 340, 360 are arranged diametrically opposite of each other on the outlet pipe 326. The second and third fluids 350, 370 may thus flow directly toward each other and into the outlet portion 334 of the water 330 so as to cause flow field disruption and/or turbulence, and thus minimize vortex formation. The velocity and mass flow of the second and third fluids 350, 370 are controlled so as to achieve a desired momentum by the pump 80 and the flow regulator valve 84. In particular, the desired momentum may be equal to that of the assemblies 20, 220 described above, but halved for each inlet pipe 340, 360 such that a total momentum equals the desired momentum. Each of the pump 80 and valve 84 may be controlled by the controller 190 such that the momentum of the second and third fluids 350, 370 remain constant over a desired period of time.

In some embodiments, the first and second inlet pipes 340, 360 may not be diametrically opposed to each other. In such embodiments, the central longitudinal axis 340C of the first inlet pipe 340 and the central longitudinal axis 360C of the second inlet pipe 360 define an angle at their intersection point (central point 323C of the opening 323). This angle may be less than 180 degrees such that the first and second inlet pipes 340, 360 are not diametrically opposed but still inject the first and second fluids 350, 370 in substantially opposing directions and disrupt the vortex. In other embodiments, more than two inlet pipes may be provided, with the plurality of inlet pipes arranged so as to be relatively evenly spaced around the outlet pipe 326. In such embodiments, the angle between the longitudinal axes 340C, 360C is in a range of 90 degrees and 179 degrees.

Figure 7B:
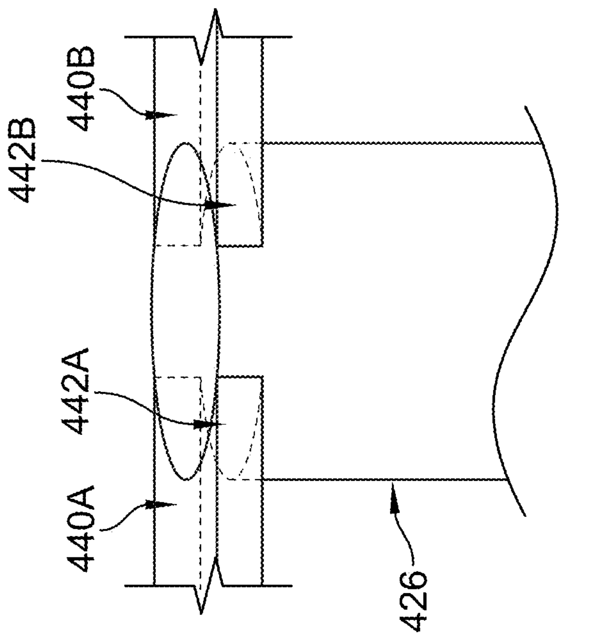
FIG. 7B is an enlarged side view of the fluid vortex breaker assembly of FIG. 7A.
Figure 7A:
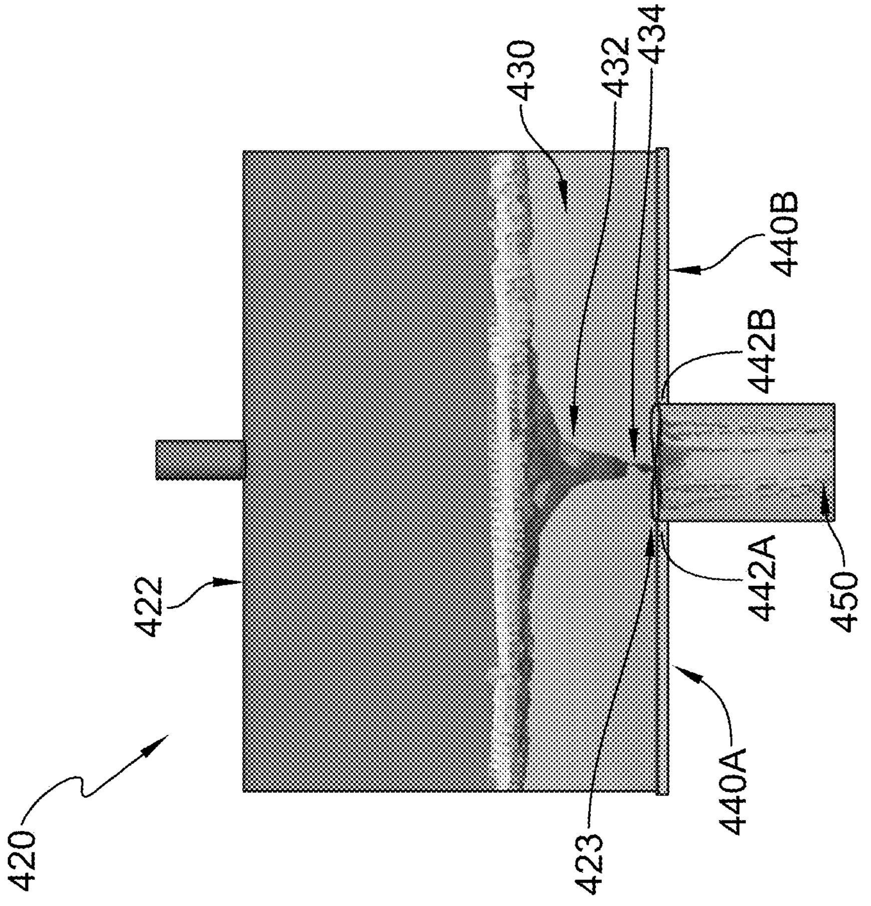
FIG. 7A is a side view of a fluid vortex breaker assembly according to a further aspect of the present disclosure, showing that the assembly includes slits in the outer wall of the outlet pipe configured to allow water to be injected into the outlet pipe to reduce vortex formation.

Another embodiment of a fluid vortex breaker assembly 420 in accordance with the present disclosure is shown in FIG. 7A and FIG. 7B. The fluid vortex breaker assembly 420 is configured to be utilized in the electrolysis system 100 and is substantially similar to the fluid vortex breaker assemblies 20, 220, 320 described herein. Accordingly, similar reference numbers in the 400 series indicate features that are common between the fluid vortex breaker assembly 420 and the fluid vortex breaker assemblies 20, 220, 320. The descriptions of the fluid vortex breaker assemblies 20, 220, 320 are incorporated by reference to apply to the fluid vortex breaker assembly 420, except in instances when it conflicts with the specific description and the drawings of the fluid vortex breaker assembly 420.

The fluid vortex breaker assembly 420 is formed substantially similar to the fluid vortex breaker assemblies 20, 220, 320 and includes similar components as those described above, including the vessel 422, the opening 423, the outlet pipe 426, and the water 430, as shown in FIG. 7A and FIG. 7B. The assembly 420 differs from the assemblies 20, 220, 320 described above in that the assembly 420 includes two thin inlet conduits 440A, 440B that extend from opposing sides of the outlet pipe 426 and each terminate at a slit 442A, 442B formed in the top end of the outlet pipe 426. The slits 442A, 442B are formed to be annular and extend partially around the circumference of the outlet pipe 426.

The assembly 420 may function similarly to the assembly 320, in particular including second and third fluids 450, 470 that flow generally toward each other and into the outlet portion 434 of the water 430 so as to cause flow field disruption and/or turbulence, and thus minimize vortex formation, as can be seen in FIG. 7A and FIG. 7B. The velocity and mass flow of the second and third fluids 450, 470 are controlled so as to achieve a desired momentum by the pump 80 and the flow regulator valve 84. In particular, the desired momentum may be halved for each inlet conduit 440A, 440B such that a total momentum equals the desired momentum. Each of the pump 80 and valve 84 may be controlled by the controller 190 such that the momentum of the second and third fluids 450, 470 remain constant over a desired period of time.

Figure 8B:
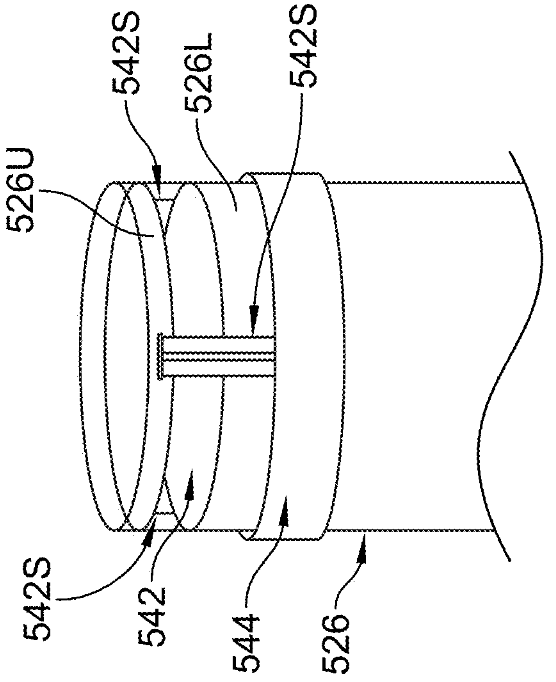
FIG. 8B is an enlarged side view of the fluid vortex breaker assembly of FIG. 8A.
Figure 8A:
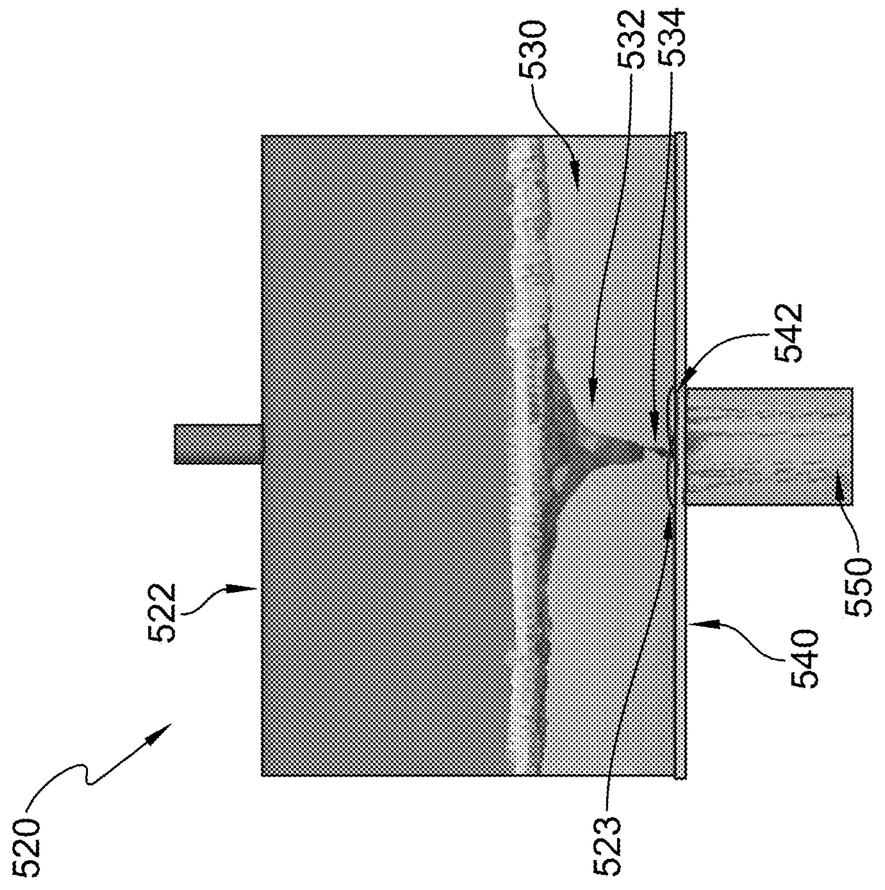
FIG. 8A is a side view of a fluid vortex breaker assembly according to a further aspect of the present disclosure, showing that the assembly includes a single, generally continuous slit the outer wall of the outlet pipe configured to allow water to be injected into the outlet pipe to reduce vortex formation.
Figure 8C:
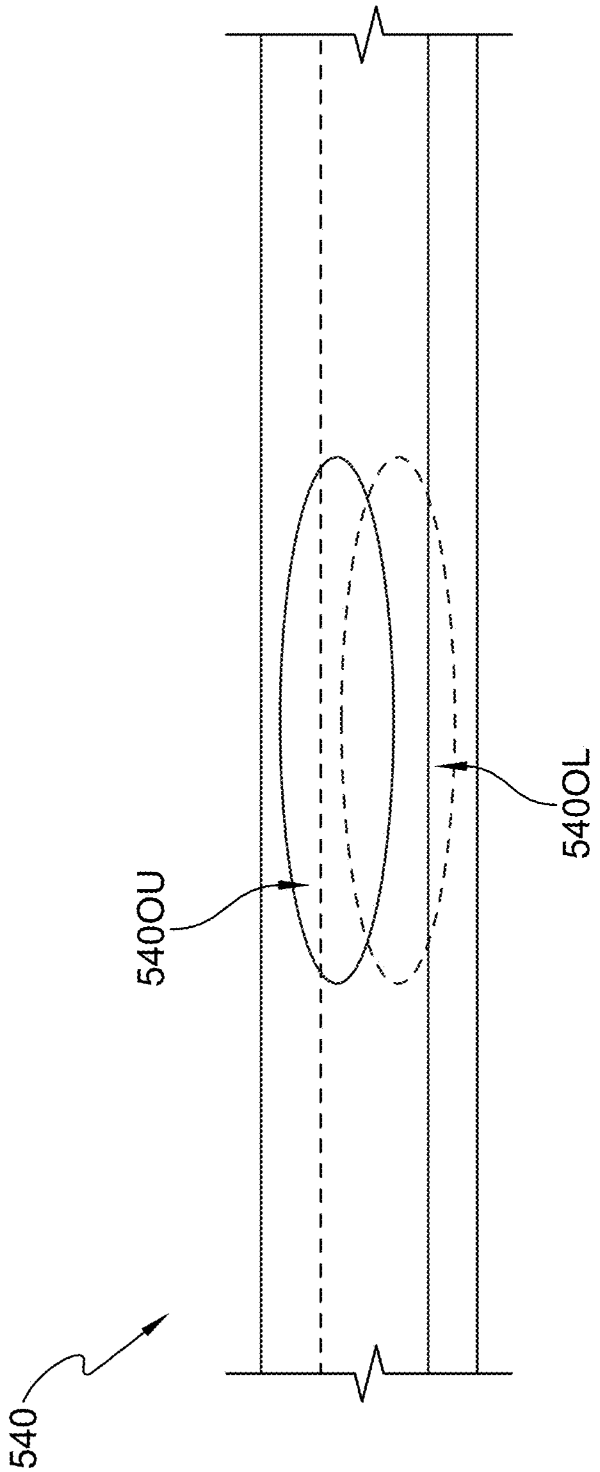
FIG. 8C is an enlarged side view of an inlet conduit of the fluid vortex breaker assembly of FIGS. 8A and 8B.

Another embodiment of a fluid vortex breaker assembly 520 in accordance with the present disclosure is shown in FIG. 8A, FIG. 8B, and FIG. 8C. The fluid vortex breaker assembly 520 is configured to be utilized in the electrolysis system 100 and is substantially similar to the fluid vortex breaker assemblies 20, 220, 320, 420 described herein. Accordingly, similar reference numbers in the 500 series indicate features that are common between the fluid vortex breaker assembly 520 and the fluid vortex breaker assemblies 20, 220, 320, 420. The descriptions of the fluid vortex breaker assemblies 20, 220, 320, 420 are incorporated by reference to apply to the fluid vortex breaker assembly 520, except in instances when it conflicts with the specific description and the drawings of the fluid vortex breaker assembly 520.

The fluid vortex breaker assembly 520 is formed substantially similar to the fluid vortex breaker assemblies 20, 220, 320, 420 and includes similar components as those described above, including the vessel 522, the opening 523, the outlet pipe 526, and the water 530, as shown in FIG. 8A and FIG. 8B. The assembly 520 differs from the assemblies 20, 220, 320, 420 described above in that the assembly 520 includes a substantially continuous slit 542 formed in the top end of the outlet pipe 526 that extends around the circumference of the outlet pipe 526.

In order to provide structural rigidity around the slit 542, the outlet pipe 526 includes a plurality of support members 542S arranged around the circumference of the outlet pipe 526 and coupled to portions 526U, 526L of the outlet pipe 526 above and below the slit 542, as shown in FIG. 8B. The assembly 520 may further include a slidable slit cover 544 configured to slide along the support members 542S or adjacent to the support members 542S and selectively cover the slit 542, as shown in FIG. 8B. In some embodiments, the controller 190 may be configured to control the slit cover 544 to open and close the slit 542.

As shown in FIG. 8C, the assembly 520 further includes a thin inlet conduit 540 that surrounds the slit 542 and delivers the second fluid 550 through the slit 542 and into the outlet pipe 526. The inlet conduit 540 is formed to include an upper central opening 5400U and a lower central opening 5400L through which the outlet pipe 526 extends. Accordingly, the second fluid 550 may flow through the hollow conduit 540, directly through the slit 542, and into the outlet pipe 526.

The second fluid 550 flows similarly to the flow of the fluid 450 of the assembly 420 described above in that the fluid 550 interacts with the outlet portion 534 of the water 530 so as to cause flow field disruption and/or turbulence, and thus minimize vortex formation, as can be seen in FIG. 8A. The use of a nearly continuous slit 542 around the outlet pipe 526 may provide increased uniformity of the distribution of the second fluid 550 as it interacts with the water 530. The velocity and mass flow of the second fluid 550 is controlled so as to achieve a desired momentum by the pump 80 and the flow regulator valve 84. Each of the pump 80 and valve 84 may be controlled by the controller 190 such that the momentum of the second fluid 550 remains constant over a desired period of time.

A method of breaking a fluidic vortex includes a first operation of providing a first fluid within a vessel, the vessel including an opening formed in a sidewall of the vessel through which the first fluid is configured to selectively flow. The method includes a second operation of coupling a first conduit to the vessel such that the first fluid is configured to flow from the vessel and into the first conduit via the opening, and a third operation of forming at least one inlet in the first conduit. The method includes a fourth operation of providing a second fluid from a fluid source to the at least one inlet, and a fifth operation of drawing the first fluid from the vessel and into the first conduit. The method includes a sixth operation of ejecting the second fluid into the first conduit at a predetermined flow momentum such that the second fluid interacts with the first fluid flowing from the vessel and through the first conduit so as to create flow field disruption and minimize formation of a fluidic vortex of the first fluid at the opening of the vessel.

As opposed to conventional mechanical vortex breakers, the fluid vortex breaker assemblies 20, 220, 320, 420, 520 of the present disclosure provide a number of improvements. Firstly, the need for physical components that obstruct fluid flow within the outlet pipe is eliminated, as these are replaced with the inlets or inlet pipe(s) with an adjustable flow of deionized water. Moreover, the level of the water within the vessel is no longer important for vortex breaker functionality. As such, the vessels, in particular the separators, may be smaller. Moreover, a wider range of water levels may be present in the separator, allowing for greater oxygen efficiency. The adjustable aspect of the flow of the water from the inlets or inlet pipe(s) allows for variation in the control of the vortex formation. Even further, because the elimination of the walls of the convention mechanical vortex breakers, difficult welding of the walls, the plate, and other components is eliminated. This reduces manufacturing effort, lowers the cost of construction, provides for easier inspections, and provides for easier adjustments and replacements.

The following described aspects of the present invention are contemplated and non-limiting:

A first aspect of the present invention relates to a vortex breaker assembly. The vortex breaker assembly comprises a vessel having a first fluid arranged therein, a first conduit coupled to the vessel, and a fluid source. The vessel includes an opening formed in an outer wall of the vessel through which the fluid is configured to selectively flow. The first conduit is configured to fluidically open into the vessel via the opening such that the first fluid is configured to flow from the vessel and into the first conduit via the opening. The first conduit includes at least one inlet formed in an outer wall of the first conduit and opening into the first conduit. The fluid source is configured to provide a second fluid to the at least one inlet. The second fluid flows into the first conduit from the at least one inlet at a predetermined flow momentum such that the second fluid interacts with the first fluid flowing from the vessel and through the first conduit so as to disrupt a flow field of the first fluid and minimize formation of a fluidic vortex of the first fluid at the opening of the vessel.

A second aspect of the present invention relates to a method of breaking a fluidic vortex. The method comprises providing a first fluid within a vessel, the vessel including an opening formed in a sidewall of the vessel through which the first fluid is configured to selectively flow, coupling a first conduit to the vessel that opens into the vessel via the opening such that the first fluid is configured to flow from the vessel and into the first conduit via the opening, forming at least one inlet in an outer wall of the first conduit, the at least one inlet opening into the first conduit, providing a second fluid from a fluid source to the at least one inlet. drawing the first fluid from the vessel and into the first conduit, and ejecting the second fluid into the first conduit at a predetermined flow momentum such that the second fluid interacts with the first fluid flowing from the vessel and through the first conduit so as to disrupt a flow field of the first fluid and minimize formation of a fluidic vortex of the first fluid at the opening of the vessel.

In the first aspect of the present invention, the vortex breaker assembly may further comprise at least one inlet pipe fluidically coupled to the at least one inlet. The at least one inlet may be located proximate to a first end of the first conduit that is coupled to the vessel such that the at least one inlet is proximate to the opening of the vessel. The at least one inlet pipe may fluidically open into the first conduit via the at least one inlet. In the first aspect of the present invention, the predetermined flow momentum of the second fluid flow into the first conduit may be constant over a predetermined period of time. In the first aspect of the present invention, the opening of the vessel may be located on a bottom sidewall of the vessel such that the first fluid is configured to selectively drain through the opening. The first conduit may be substantially vertical so as to allow drainage of the first fluid from the vessel. In the first aspect of the present invention, the predetermined period of time during which the predetermined flow momentum of the second fluid flow is constant may be a time period from when the first fluid begins draining through the opening to when the first fluid stops draining through the opening.

In the first aspect of the present invention, the vortex breaker assembly may further comprise a first pump and a flow regulator valve located between and fluidically interconnecting the fluid source and the at least one inlet pipe, and a controller. The first pump and the flow regulator valve may be configured to control a velocity and a mass flow of the second fluid flow so as to control the flow momentum of the second fluid into the first conduit. The controller may be configured to control the first pump and the flow regulator valve so as to control the velocity and the mass flow of the second fluid flow. In the first aspect of the present invention, a second pump may be fluidically connected to a second end of the first conduit opposite the first end of the pipe and located downstream of the opening of the vessel. The second pump may be configured to draw the first fluid from the vessel via the opening and the first conduit. In the second aspect of the present invention, the fluid source may be a polishing loop fluidically connected to an output of the second pump and fluidically connected to an input of the first pump such that the first fluid flows into the polishing loop, is treated via the polishing loop, and exits the polishing loop as the second fluid. In the first aspect of the present invention, the vessel may be at least one of an oxygen separator or a hydrogen separator. The first fluid may be deionized water and the second fluid may be deionized water.

In the first aspect of the present invention, the vortex breaker assembly may further comprise at least one inlet pipe fluidically coupled to the at least one inlet. The at least one inlet pipe may be arranged such that the second fluid flows against a direction of rotation of the fluidic vortex of the first fluid.

In the first aspect of the present invention, the vortex breaker assembly may further comprise at least one inlet pipe fluidically coupled to the at least one inlet. The at least one inlet pipe may be arranged such that the second fluid flows with a direction of rotation of the fluidic vortex of the first fluid.

In the first aspect of the present invention, the vortex breaker assembly may further comprise at least one inlet pipe fluidically coupled to the at least one inlet. The at least one inlet pipe may include a first inlet pipe arranged at a first position of the first conduit and a second inlet pipe arranged at a second position of the first conduit different than the first position. In the first aspect of the present invention, the first inlet pipe and the second inlet pipe may be arranged diametrically opposite of each other on opposing sides of the first conduit.

In the second aspect of the present invention, the method may further comprise coupling at least one inlet pipe to the first conduit, the at least one inlet pipe opening into the first conduit. The second fluid may flow through the at least one inlet pipe and into the first conduit via the at least one inlet. The predetermined flow momentum of the second fluid flow into the first conduit may be constant over a predetermined period of time. In the second aspect of the present invention, the predetermined period of time during which the predetermined flow momentum of the second fluid flow is constant may be a time period from when the first fluid begins draining through the opening to when the first fluid stops draining through the opening. In the second aspect of the present invention, the ejecting of the second fluid from the at least one inlet pipe into the first conduit may include ejecting the second fluid against a direction of rotation of the fluidic vortex of the first fluid.

In the second aspect of the present invention, the ejecting of the second fluid from the at least one inlet pipe into the first conduit includes ejecting the second fluid with a direction of rotation of the fluidic vortex of the first fluid.

In the second aspect of the present invention, the method may further comprise increasing a mass flow of the second fluid flowing through the at least one inlet pipe and decreasing a velocity of the second fluid flowing through the at least one inlet pipe via a first pump and a flow regulator valve located between and fluidically interconnecting the fluid source and the at least one inlet pipe such that the flow momentum of the second fluid remains constant. In the second aspect of the present invention, the method may further comprise decreasing a mass flow of the second fluid flowing through the at least one inlet pipe and increasing a velocity of the second fluid flowing through the at least one inlet pipe via the first pump and the flow regulator valve such that the flow momentum of the second fluid remains constant.

In the second aspect of the present invention, the at least one inlet pipe may include a first inlet pipe arranged at a first position of the first conduit and a second inlet pipe arranged at a second position of the first conduit different than the first position. A sum of a first flow momentum of the second fluid flowing through the first inlet pipe and a second flow momentum of the second fluid flowing through the second inlet pipe may be equal to the predetermined flow momentum.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first", "second", "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising", "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A vortex breaker assembly, comprising:

a vessel having a first fluid arranged therein, the vessel including an opening formed in an outer wall of the vessel through which the first fluid is configured to selectively flow;

a first conduit coupled to the vessel and configured to fluidically open into the vessel via the opening such that the first fluid is configured to flow from the vessel and into the first conduit via the opening, the first conduit including at least one inlet formed in an outer wall of the first conduit and opening into the first conduit; and a fluid source configured to provide a second fluid to the at least one inlet, and at least one inlet pipe fluidically coupled to the at least one inlet, wherein the at least one inlet pipe is arranged such that the second fluid flows against a direction of rotation of the fluidic vortex of the first fluid, wherein the second fluid flows into the first conduit from the at least one inlet at a predetermined flow momentum such that the second fluid interacts with the first fluid flowing from the vessel and through the first conduit so as to disrupt a flow field of the first fluid and minimize formation of a fluidic vortex of the first fluid at the opening of the vessel.

2. The vortex breaker assembly of claim 1, wherein the at least one inlet is located proximate to a first end of the first conduit that is coupled to the vessel such that the at least one inlet is proximate to the opening of the vessel, and wherein the at least one inlet pipe fluidically opens into the first conduit via the at least one inlet.

3. The vortex breaker assembly of claim 2, wherein the predetermined flow momentum of the second fluid flow into the first conduit is constant over a predetermined period of time.

4. The vortex breaker assembly of claim 3, wherein the opening of the vessel is located on a bottom sidewall of the vessel such that the first fluid is configured to selectively drain through the opening, and wherein the first conduit is substantially vertical so as to allow drainage of the first fluid from the vessel.

5. The vortex breaker assembly of claim 4, wherein the predetermined period of time during which the predetermined flow momentum of the second fluid flow is constant is a time period from when the first fluid begins draining through the opening to when the first fluid stops draining through the opening.

6. The vortex breaker assembly of claim 2, further comprising:

a first pump and a flow regulator valve located between and fluidically interconnecting the fluid source and the at least one inlet pipe, the first pump and the flow regulator valve being configured to control a velocity and a mass flow of the second fluid flow so as to control the flow momentum of the second fluid into the first conduit; and a controller configured to control the first pump and the flow regulator valve so as to control the velocity and the mass flow of the second fluid flow.

7. The vortex breaker assembly of claim 6, further comprising:

a second pump fluidically connected to a second end of the first conduit opposite the first end of the first conduit and located downstream of the opening of the vessel, the second pump being configured to draw the first fluid from the vessel via the opening and the first conduit.

8. The vortex breaker assembly of claim 7, wherein the fluid source is a polishing loop fluidically connected to an output of the second pump and fluidically connected to an input of the first pump such that the first fluid flows into the polishing loop, is treated via the polishing loop, and exits the polishing loop as the second fluid.

9. The vortex breaker assembly of claim 8, wherein the vessel is at least one of an oxygen separator or a hydrogen separator, and wherein the first fluid is deionized water and the second fluid is deionized water.

10. The vortex breaker assembly of claim 1, further comprising:

at least one inlet pipe fluidically coupled to the at least one inlet, wherein the at least one inlet pipe includes a first inlet pipe arranged at a first position of the first conduit and a second inlet pipe arranged at a second position of the first conduit different than the first position.

11. The vortex breaker assembly of claim 10, wherein the first inlet pipe and the second inlet pipe are arranged diametrically opposite of each other on opposing sides of the first conduit.

12. A method of breaking a fluidic vortex, comprising:

providing a first fluid within a vessel, the vessel including an opening formed in a sidewall of the vessel through which the first fluid is configured to selectively flow;

coupling a first conduit to the vessel that opens into the vessel via the opening such that the first fluid is configured to flow from the vessel and into the first conduit via the opening;

forming at least one inlet in an outer wall of the first conduit, the at least one inlet opening into the first conduit;

providing a second fluid from a fluid source to the at least one inlet;

drawing the first fluid from the vessel and into the first conduit; and ejecting the second fluid into the first conduit at a predetermined flow momentum such that the second fluid interacts with the first fluid flowing from the vessel and through the first conduit so as to disrupt a flow field of the first fluid and minimize formation of a fluidic vortex of the first fluid at the opening of the vessel, wherein the ejecting of the second fluid includes ejecting the second fluid against a direction of rotation of the fluidic vortex of the first fluid.

13. The method of claim 12, further comprising:

coupling at least one inlet pipe to the first conduit, the at least one inlet pipe opening into the first conduit, wherein the second fluid flows through the at least one inlet pipe and into the first conduit via the at least one inlet, and wherein the predetermined flow momentum of the second fluid flow into the first conduit is constant over a predetermined period of time.

14. The method of claim 13, wherein the predetermined period of time during which the predetermined flow momentum of the second fluid flow is constant is a time period from when the first fluid begins draining through the opening to when the first fluid stops draining through the opening.

15. The method of claim 14, further comprising at least one of:

increasing a mass flow of the second fluid flowing through the at least one inlet pipe and decreasing a velocity of the second fluid flowing through the at least one inlet pipe via a first pump and a flow regulator valve located between and fluidically interconnecting the fluid source and the at least one inlet pipe such that the flow momentum of the second fluid remains constant; and decreasing a mass flow of the second fluid flowing through the at least one inlet pipe and increasing a velocity of the second fluid flowing through the at least one inlet pipe via the first pump and the flow regulator valve such that the flow momentum of the second fluid remains constant.

16. The method of claim 14, wherein the at least one inlet pipe includes a first inlet pipe arranged at a first position of the first conduit and a second inlet pipe arranged at a second position of the first conduit different than the first position, and wherein a sum of a first flow momentum of the second fluid flowing through the first inlet pipe and a second flow momentum of the second fluid flowing through the second inlet pipe is equal to the predetermined flow momentum.

* * * * *